United States Patent
Grimm et al.

(10) Patent No.: US 12,017,239 B2
(45) Date of Patent: *Jun. 25, 2024

(54) FLUID APPLICATION SYSTEMS INCLUDING PRESSURE DAMPENERS

(71) Applicant: Capstan Ag Systems, Inc., Topeka, KS (US)

(72) Inventors: Jeffrey John Grimm, Holton, KS (US); Andrew J. Holtz, Berryton, KS (US); Jesse Koch, Topeka, KS (US)

(73) Assignee: Capstan Ag Systems, Inc., Topeka, KS (US)

( * ) Notice: Subject to any disclaimer, the term of this patent is extended or adjusted under 35 U.S.C. 154(b) by 251 days.

This patent is subject to a terminal disclaimer.

(21) Appl. No.: 17/445,390

(22) Filed: Aug. 18, 2021

(65) Prior Publication Data

US 2022/0080440 A1 Mar. 17, 2022

Related U.S. Application Data

(63) Continuation of application No. 16/260,604, filed on Jan. 29, 2019, now Pat. No. 11,097,298.

(Continued)

(51) Int. Cl.
*B05B 12/08* (2006.01)
*A01C 7/06* (2006.01)
(Continued)

(52) U.S. Cl.
CPC ............ *B05B 12/085* (2013.01); *A01C 7/06* (2013.01); *A01C 23/007* (2013.01); *B05B 1/3053* (2013.01)

(58) Field of Classification Search
CPC ..... B05B 12/085; B05B 1/3053; B05B 12/08; B05B 12/00; B05B 1/3046; B05B 1/304;
(Continued)

(56) References Cited

U.S. PATENT DOCUMENTS 2,967,697 A * 1/1961 Sellers ................... F02M 69/30
261/36.2
4,069,844 A 1/1978 Zahid
(Continued)

FOREIGN PATENT DOCUMENTS

CA 2813949 A1 2/2014

OTHER PUBLICATIONS

Curley, Robert G. et al., "Planter Attachment for the Spot Application of Soil Anticrustant," ASAE Meeting Presentation, Jun. 23-26, 1991, 11 pgs.
(Continued)

*Primary Examiner* — Christopher J. Novosad
(74) *Attorney, Agent, or Firm* — Armstrong Teasdale LLP

(57) ABSTRACT

A fluid application system includes a manifold defining an internal passageway for fluid flow therethrough and a plurality of nozzle assemblies connected in fluid communication with the internal passageway. Each nozzle assembly of the plurality of nozzle assemblies includes a body defining a fluid passage, an inlet connected to the manifold for receiving fluid flow into the fluid passage, and a spray outlet for discharging fluid from the fluid passage. Each nozzle assembly also includes an electrically actuated valve fluidly connected between the inlet and the spray outlet and configured to control fluid flow through the fluid passage. Each nozzle assembly further includes a pressure dampener connected in fluid communication with the fluid passage upstream of the electrically actuated valve. The pressure dampener is configured to dampen fluctuations in fluid pressure within the fluid passage.

20 Claims, 15 Drawing Sheets

Related U.S. Application Data

(60) Provisional application No. 62/624,582, filed on Jan. 31, 2018.

(51) Int. Cl.
*A01C 23/00* (2006.01)
*B05B 1/30* (2006.01)

(58) Field of Classification Search
CPC .... B05B 1/30; B05B 1/00; A01C 7/06; A01C 23/007; A01C 7/00; A01C 23/00
See application file for complete search history.

(56) References Cited

U.S. PATENT DOCUMENTS

| | | |
|---|---|---|
| 4,080,996 A | 3/1978 | Zahid |
| 4,265,274 A | 5/1981 | Zahid |
| 4,552,182 A | 11/1985 | Graham et al. |
| 4,679,537 A | 7/1987 | Fehrenbach et al. |
| 5,134,961 A | 8/1992 | Giles et al. |
| 5,427,350 A | 6/1995 | Rinkewich |
| 5,520,215 A | 5/1996 | Haboush |
| 5,653,389 A | 8/1997 | Henderson et al. |
| 5,704,546 A | 1/1998 | Henderson et al. |
| 5,904,296 A | 5/1999 | Doherty et al. |
| 5,927,603 A | 7/1999 | McNabb |
| 5,967,066 A | 10/1999 | Giles et al. |
| 6,173,904 B1 | 1/2001 | Doherty et al. |
| 6,264,069 B1 | 7/2001 | Hughes et al. |
| 6,273,345 B1 | 8/2001 | Kaligian et al. |
| 6,431,096 B1 | 8/2002 | Engelke et al. |
| 7,370,589 B2 | 5/2008 | Wilkerson et al. |
| 8,074,585 B2 | 12/2011 | Wilkerson et al. |
| 8,191,795 B2 | 6/2012 | Grimm et al. |
| 8,523,085 B2 | 9/2013 | Grimm et al. |
| 9,226,442 B2 | 1/2016 | Grimm et al. |
| 11,097,298 B2 * | 8/2021 | Grimm .................. A01C 7/06 |
| 2005/0284348 A1 | 12/2005 | Garennes et al. |
| 2006/0273189 A1 | 12/2006 | Grimm et al. |
| 2012/0228395 A1 | 9/2012 | Needham et al. |
| 2013/0269578 A1 | 10/2013 | Grimm et al. |
| 2014/0299673 A1 | 10/2014 | Grimm et al. |
| 2016/0015020 A1 | 1/2016 | Needham et al. |
| 2016/0073576 A1 | 3/2016 | Grimm et al. |
| 2017/0079200 A1 | 3/2017 | Posselius et al. |
| 2017/0146176 A1 | 5/2017 | Manley et al. |

OTHER PUBLICATIONS

Hancock, John A., "Design and Evaluation of a Seed-Specific Applicator for In-Furrow Chemical Application," Thesis for Master of Science Degree, University of Tennessee, Knoxville, May 2003, 172 pgs.

Non-Final Office Action for U.S. Appl. No. 16/260,604, dated Jan. 6, 2021, 17 pages.

Canadian Examination Search Report for CA Patent Application No. 2,947,881, dated Dec. 14, 2022, 7 pages.

* cited by examiner

FLUID APPLICATION SYSTEMS INCLUDING PRESSURE DAMPENERS

CROSS-REFERENCE TO RELATED APPLICATION

This application is a continuation of U.S. patent application Ser. No. 16/260,604, filed on Jan. 29, 2019, which claims priority to U.S. Provisional Patent Application Ser. No. 62/624,582, filed on Jan. 31, 2018, the disclosures of which are hereby incorporated by reference in their entirety.

BACKGROUND

The field of the disclosure relates generally to fluid application systems, and more particularly, to fluid application systems including a boom pipe or manifold connected to nozzle assemblies and methods of applying fluid using such fluid application systems.

In the agricultural industry, agricultural fluids or agrochemicals are commonly applied to plants and/or plant precursors (e.g., seeds) for a variety of reasons. For example, plants and plant precursors are often sprayed with an agricultural fluid at the time of planting to enhance germination and early development. In other applications, liquid fertilizers, pesticides, and other agrochemicals may be applied to plants or crops after planting for crop management. Agricultural fluids include, without limitation, growth promotors, growth regulators, spray fertilizers, pesticides, insecticides, and/or fungicides.

Typically, systems for applying agricultural fluids to fields include a manifold, e.g., a boom pipe, and a plurality of nozzle assemblies that receive fluid from the manifold for applying the fluid to a field. In at least some known systems, the fluid is supplied to the manifold through an inlet located between opposed ends of the manifold. The fluid travels longitudinally through the manifold from the inlet toward the opposed ends. As the fluid flows towards the opposed ends, a portion of the fluid is directed out of the manifold towards the nozzle assemblies for application to the fields.

For some applications, it is desirable to regulate or control the fluid application rate (i.e., amount of fluid applied per unit area, such as an acre) and/or the fluid flow rate (i.e., volume per unit time) through the nozzle assemblies at a preset rate and/or based on user specified parameters. In some seed planting systems, for example, it may be desirable to dispense a consistent amount of fluid on or adjacent to each seed dispensed from the seed planting system. Variations in system operating conditions may, however, make it difficult to precisely control the fluid application rate or the fluid flow rate through the nozzle assemblies. For example, fluctuations in fluid pressure upstream from the nozzle assemblies (e.g., within the manifold) can affect the fluid flow rate through the nozzle assemblies. As a result, fluctuations in the pressure of fluid supplied to the nozzles may make it difficult to precisely control the fluid application rate and/or the fluid flow rate through individual nozzle assemblies.

Accordingly, a need exists for fluid application systems that reduce or decrease fluctuations in fluid pressure within the fluid application systems.

BRIEF DESCRIPTION

A fluid application system includes a manifold defining an internal passageway for fluid flow therethrough. The fluid application system also includes a plurality of nozzle assemblies connected in fluid communication with the internal passageway. Each nozzle assembly of the plurality of nozzle assemblies includes a body defining a fluid passage, an inlet connected to the manifold for receiving fluid flow into the fluid passage, and a spray outlet for discharging fluid from the fluid passage. Each nozzle assembly also includes an electrically actuated valve fluidly connected between the inlet and the spray outlet and configured to control fluid flow through the fluid passage. Each nozzle assembly further includes a pressure dampener connected in fluid communication with the fluid passage upstream of the electrically actuated valve. The pressure dampener is configured to dampen fluctuations in fluid pressure within the fluid passage.

A seed planting system for dispensing fluid on or adjacent to seeds dispensed from the system includes a seed dispenser configured to dispense seeds through at least one of a plurality of seed dispensing outlets and into a furrow. The system also includes a manifold defining an internal passageway for fluid flow therethrough. The system further includes a plurality of nozzle assemblies connected in fluid communication with the internal passageway. Each nozzle assembly of the plurality of nozzle assemblies is located proximate to a respective one of the plurality of seed dispensing outlets. Each nozzle assembly of the plurality of nozzle assemblies includes a body defining a fluid passage, an inlet connected to the manifold for receiving fluid flow into the fluid passage, and a spray outlet for discharging fluid from the fluid passage. Each nozzle assembly also includes an electrically actuated valve fluidly connected between the inlet and the spray outlet and configured to control fluid flow through the fluid passage. Each nozzle assembly further includes a pressure dampener connected in fluid communication with the fluid passage upstream of the electrically actuated valve. The pressure dampener is configured to dampen fluctuations in fluid pressure within the fluid passage.

A nozzle assembly for use with a fluid application system is provided. The nozzle assembly includes a body defining a fluid passage, an inlet for receiving fluid flow into the fluid passage, and a spray outlet for discharging fluid from the fluid passage to a field. The nozzle assembly also includes an electrically actuated valve fluidly connected between the inlet and the spray outlet and configured to control fluid flow through the fluid passage. The nozzle assembly further includes a pressure dampener connected in fluid communication with the fluid passage upstream of the electrically actuated valve. The pressure dampener is configured to dampen fluctuations in fluid pressure within the fluid passage.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

DETAILED DESCRIPTION OF THE DRAWINGS

Figure 1:
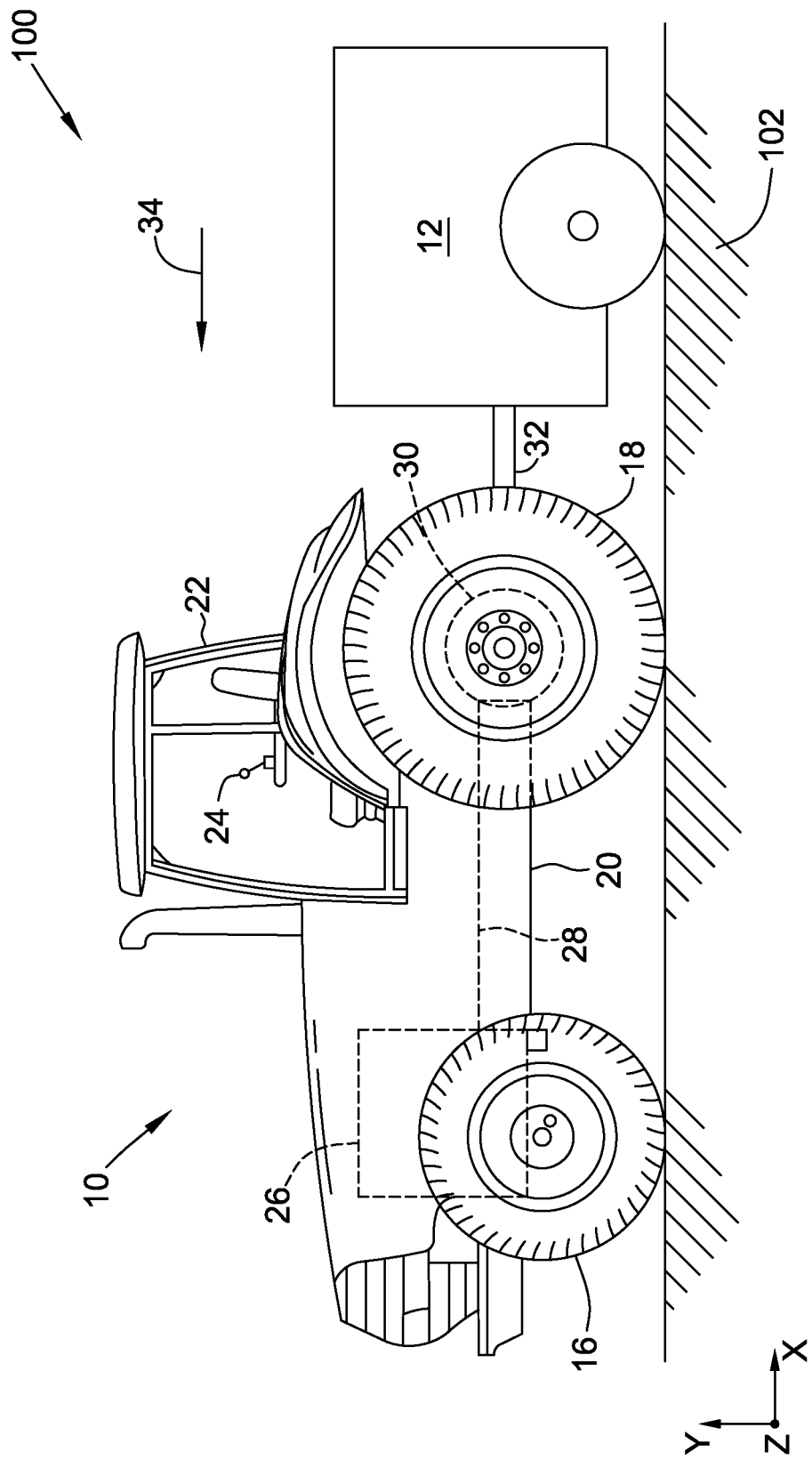
FIG. 1 is a side schematic view of one embodiment of a seed planting system.

Referring now to the drawings and in particular to FIGS. 1-7, one embodiment of a seed planting system is designated in its entirety by the reference number 100. FIG. 1 includes an X-axis, a Y-axis, and a Z-axis for reference throughout the description. Unless otherwise noted, directions, such as horizontal and vertical, refer to the orientation of the seed planting system 100 shown in FIG. 1.

The seed planting system 100 includes a motorized vehicle 10 and a planter 12 (shown schematically as a box in FIG. 1) for use in planting and spraying seeds. The motorized vehicle 10 may be any machine that enables the seed planting system 100 to function as described herein. In the exemplary embodiment, the motorized vehicle 10 is a tractor. In some embodiments, one or more components of the seed planting system 100 may be incorporated into the motorized vehicle 10 without departing from some aspects of this disclosure.

As shown, the motorized vehicle 10 includes a pair of front wheels 16, a pair or rear wheels 18, and a chassis 20 coupled to and supported by the wheels 16, 18. A cab 22 is supported by a portion of the chassis 20 and houses various control devices 24 for permitting an operator to control operation of the motorized vehicle 10. Additionally, the motorized vehicle 10 includes an engine 26 and a transmission 28 mounted on the chassis 20. The transmission 28 is operably coupled to the engine 26 and provides variably adjusted gear ratios for transferring engine power to the wheels 18 via an axle/differential 30. Additionally, as shown in FIG. 1, the motorized vehicle 10 may be configured to be coupled to the planter 12 via a suitable coupling 32 such that the vehicle 10 may pull the planter 12 as it moves in a travel direction (indicated by arrow 34) along a field 102.

The planter 12 may be any suitable apparatus for dispensing seeds to the field 102. Examples of suitable planters are described, for example, in U.S. Pat. No. 9,226,442, issued Jan. 5, 2016, and U.S. patent application Ser. No. 13/857,348, filed Apr. 5, 2013, the disclosures of which are hereby incorporated by reference in their entirety.

Figure 2:
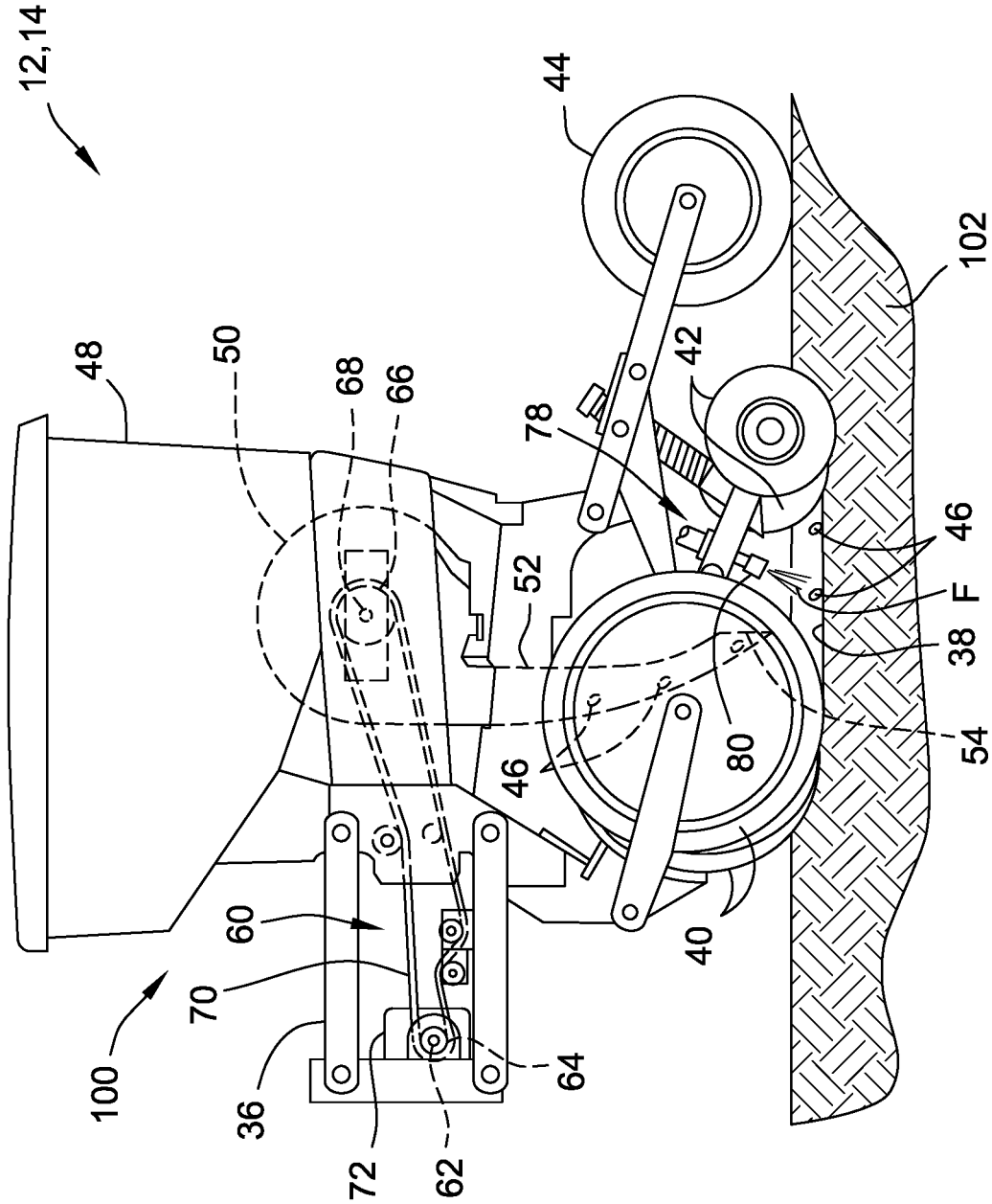
FIG. 2 is a side view of a portion of the seed planting system of FIG. 1.

As shown in FIG. 2, the planter 12 includes a plurality of row units 14 supported by a frame 36 extending along the width of the planter 12 (e.g., in a direction transverse to the travel direction 34). Row units 14 are configured to at least spray seeds and/or plants and, in some embodiments, are configured to plant and spray seeds. Each row unit 14 may include a furrow creation device. In general, the furrow creation device may be configured to create a trench or furrow 38 within the ground for planting the seeds 46. In several embodiments, the furrow creation device may include a pair of laterally spaced opening discs 40, a pair of laterally spaced closing discs 42 and a press wheel 44. As is generally understood, the opening discs 40 may be configured to open a furrow 38 within the ground. Once the seeds 46 have been deposited into the furrow 38, the closing discs 42 may be configured to close the furrow 38 over the seeds 46. The press wheel 44 may then compact the soil that has been closed over the seeds 46.

Additionally, each row unit 14 also includes a seed hopper 48, a seed meter 50, and a seed tube 52, collectively referred to herein as a seed dispenser. The seed tube 52 includes an outlet end 54 spaced from the seed meter 50 for dispensing the seeds 46 therethrough. In general, the seed dispenser (i.e., the seed hopper 48, seed meter 50, and seed tube 52) is configured to dispense the seeds 46 into the furrow 38. For example, the seed hopper 48 may be any suitable container or other storage device that is configured for storing and dispensing the seeds 46 into the seed meter 50. Also, the seed meter 50 may be any suitable seed meter that is configured to dispense the seeds 46 into the seed tube 52 at a metered rate. The seeds 46 are dispensed from the outlet end 54 of the seed tube 52 into the furrow 38. Although the system 100 is described herein with reference to dispensing and/or spraying the seeds 46, the system 100 may generally be utilized to dispense and/or spray any suitable type of plant and/or plant precursor, such as seeds, seedlings, transplants, encapsulated tissue cultures and/or any other suitable plant precursors.

In one embodiment, the seed meter 50 includes a housing and a seed plate or disc rotatably supported within the housing. The seed disc includes a plurality of indentions, channels and/or other suitable recessed features that are spaced apart from one another around the seed disc (e.g., in a circular array) to allow the seeds 46 to be dispensed at a given frequency. Specifically, each recessed feature is configured to grab a single seed 46 (e.g., via a vacuum applied to the recessed feature) as such recessed feature is rotated past the location at which the seeds 46 are fed into the housing from the seed hopper 48. As the seed disc is rotated, the seeds 46 are carried by the recessed features and dispensed into the seed tube 52. The metered rate may be predetermined, set, changed, or otherwise controlled (e.g., by the control system of the planter 12 or mechanically based on a rate of travel of the row unit 14). The seeds 46 are dispensed from the seed tube 52 into furrow 38. For example, at a given rotational speed for the seed disc, the seed meter 50 dispenses the seeds 46 at a constant frequency. When the planter 12 travels at a constant speed, the seeds 46 are spaced apart equally from one another within the furrow 38. As the travel speed of the planter 12 increases or decreases, the rotational speed of the seed disc may also be increased or decreased to maintain equal spacing or a predetermined spacing of the seeds 46 within the furrow 38. Such variation of the rotational speed of the seed disc is provided by a drive system 60 and/or controlled by a control system of the planter 12.

The drive system 60 is or includes any suitable device and/or combination of devices configured to rotate the seed disc of the seed meter 50. In the illustrated embodiment, for example, the drive system 60 is a sprocket/chain arrangement including a drive shaft 62, a first sprocket 64 coupled to the drive shaft 62, a second sprocket 66 coupled to the seed disc (e.g., via a shaft 68) and a chain 70 coupled between the first and second sprockets 64, 66. The drive shaft 62 is configured to rotate the first sprocket 64, which, in turn, rotates the second sprocket 66 via the chain 70. Rotation of the second sprocket 66 results in rotation of the shaft 68 and, thus, rotation of the seed disc within the housing of the seed meter 50. The drive system 60 further includes a motor 72 (e.g., an electric or hydraulic motor) rotatably coupled to the drive shaft 62 that is configured to be controlled by the control system of the planter 12. Specifically, the control system is configured to receive signals associated with the travel speed of the planter 12 from a sensor or other suitable device (e.g., an encoder or shaft sensor, global positioning system receiver, or other device) and regulate the rotational speed of the motor 72 based on the travel speed of the planter 12 such that a desired seed spacing is achieved or maintained. In alternative embodiments, the drive system 60 is or includes other components or devices. For example, the drive system 60 may be configured to rotate the seed disc through a connection with one or more wheels or other rotating features of the planter 12. A transmission, clutch, and/or other components may be used to regulate the rotational speed of the seed disc and therefore achieve or maintain desired seed spacing.

In alternative embodiments, the row unit 14 is or includes other suitable components for dispensing the seeds 46. In further alternative embodiments, the planter 12 does not include the seed hopper 48, seed meter 50, seed tube 52, and/or other components for dispensing the seeds 46, and instead sprays existing seeds 46 or existing plants. In such embodiments, the row unit 14 may not include the seed dispenser.

Referring still to FIG. 2, each row unit 14 also includes at least one nozzle assembly 78 for spraying a fluid F on and/or adjacent to the seeds 46 dispensed from the seed tube 52. The nozzle assembly 78 may be mounted to the row unit 14 in any manner that enables the seed planting system 100 to operate as described herein. In this embodiment, the nozzle assembly 78 is mounted on the frame (or other rigid component) of the seed planting system 100 and remains substantially stationary relative to the seed tube 52. The nozzle assembly 78 includes a nozzle 80 configured to dispense fluid F on and/or adjacent to the seeds 46. In some embodiments, the nozzle 80 is configured to dispense the fluid F in a direction away from the seeds 46. For example, in some embodiments, a fertilizer having a high salinity is dispensed to the field 102 in a direction away from the seeds 46 and outside of the furrow 38 as the seeds 46 are dispensed. The nozzle 80 may generally comprise any suitable nozzle known in the art, such as any nozzle typically utilized in an agricultural spraying system. In some embodiments, the nozzle 80 may include a spray tip configured to produce a desired spray pattern. Additionally or alternatively, the nozzle 80 may include a check valve. In some embodiments, the nozzle assembly 78 may also include an electrically actuated valve 82 (FIG. 3), such as a solenoid valve, mounted to or integrated within a portion of the nozzle 80. In other embodiments, such as the embodiment shown in FIGS. 4-7, an electrically actuated valve 82 may be located upstream from the nozzle assembly 78. In some embodiments, the flow of the fluid F through the nozzles 80 may be modified or controlled using pulse width modulation (PWM) technology.

Figure 3:
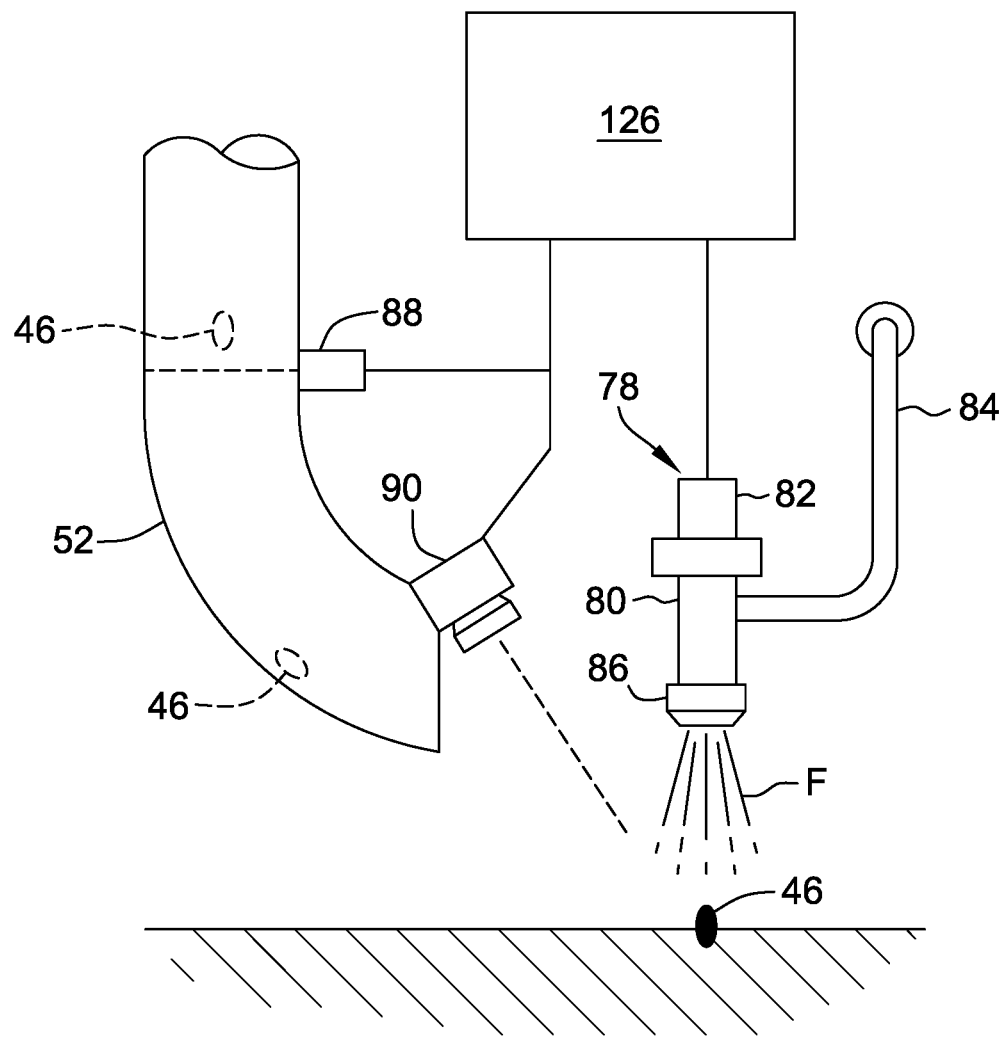
FIG. 3 is a schematic view of a portion of the seed planting system of FIG. 1.

FIG. 3 is an enlarged schematic view of a portion of the seed planting system 100 illustrating additional details of the seed dispenser and the nozzle assembly 78. As shown in FIG. 3, the nozzle assembly 78 is connected to a suitable fluid conduit 84, such as a pipe or hose, that provides fluid F to the nozzle assembly 78. The valve 82 of the nozzle assembly 78 controls the flow of the fluid F from the fluid conduit 84 to the nozzle 80 and a spray tip 86 configured to produce a specified spray pattern.

In some embodiments, the seed planting system 100 is configured to spray the fluid F on and/or adjacent to the seed 46 using, in part, one or more sensors. In the illustrated embodiment, for example, the seed planting system 100 includes a seed sensor 88. The seed sensor 88 is configured to sense, at least, when the seed 46 passes through and/or exits the seed tube 52. For example, the seed sensor 88 may be an optical sensor (e.g., a camera) or a beam break sensor (e.g., infrared beam break sensor) producing a beam which when broken sends a signal (e.g., a change in voltage). Additionally or alternatively, the seed sensor 88 may be a mechanical sensor which at least partially obstructs the seed tube 52 and that produces a signal (e.g., change in voltage) when the seed 46 contacts or moves the mechanical sensor. In alternative embodiments, other suitable sensor(s) are used to detect when the seed 46 exits the seed tube 52. In further embodiments, the sensor 88 is configured to determine a location of the seed 46 in the furrow 38. For example, the sensor 88 may be or include a camera which images the seed 46 in the furrow 38. Additionally or alternatively, the seed planting system 100 may include a second sensor, such as a camera 90, configured to capture one or more images of each seed 46 after it is dispensed from the seed tube 52 and/or as it is being sprayed by the nozzle assembly(ies) 78. Additional details and operation of the seed sensor 88 and the camera 90 are described in U.S. patent application Ser. No. 13/857,348, filed Apr. 5, 2013, the disclosure of which is hereby incorporated by reference in its entirety. Using image recognition techniques, distance calculating techniques, and/or a time when the seed 46 leaves the seed tube 52, the location of the seed 46 may be determined. The sensor(s) 88, 90 may send a signal to a controller 126 of the seed planting system 100 and/or a control system of the planter 12 for use in controlling the nozzle assembly 78, such as when to actuate the valve 82.

In reference to FIGS. 4-7, an embodiment of a fluid application system 101 of seed planting system 100 includes a boom pipe or manifold 104 connected in fluid communication with the nozzle assemblies 78 and a suitable fluid source (not shown), such as a fluid tank. The fluid F is supplied to each nozzle assembly 78 through the manifold 104. A pump (not shown), such as a centrifugal pump, may be positioned upstream of the nozzle assembly 78 and/or the manifold 104 for pumping the fluid F from the fluid source to the nozzle assembly 78. A pressure sensor 105 may be fluidly connected upstream of the manifold 104 to measure the pressure of fluid supplied to the manifold 104. The manifold 104 defines an internal passageway 106 (shown in FIG. 7) for the fluid F to flow therethrough. In reference to the orientation of the seed planting system 100 shown in FIG. 4, the manifold 104 extends horizontally and is spaced vertically from the field 102 (shown in FIG. 1). The manifold 104 includes a first end 110, a second end 112, and a sidewall 114 extending from the first end 110 to the second end 112. In the illustrated embodiment, the sidewall 114 forms a substantially cylindrical shape, although the manifold 104 may have any suitable shape that enables the seed planting system 100 to function as described herein. In some embodiments, the seed planting system 100 includes a plurality of the manifolds 104.

Figure 4:
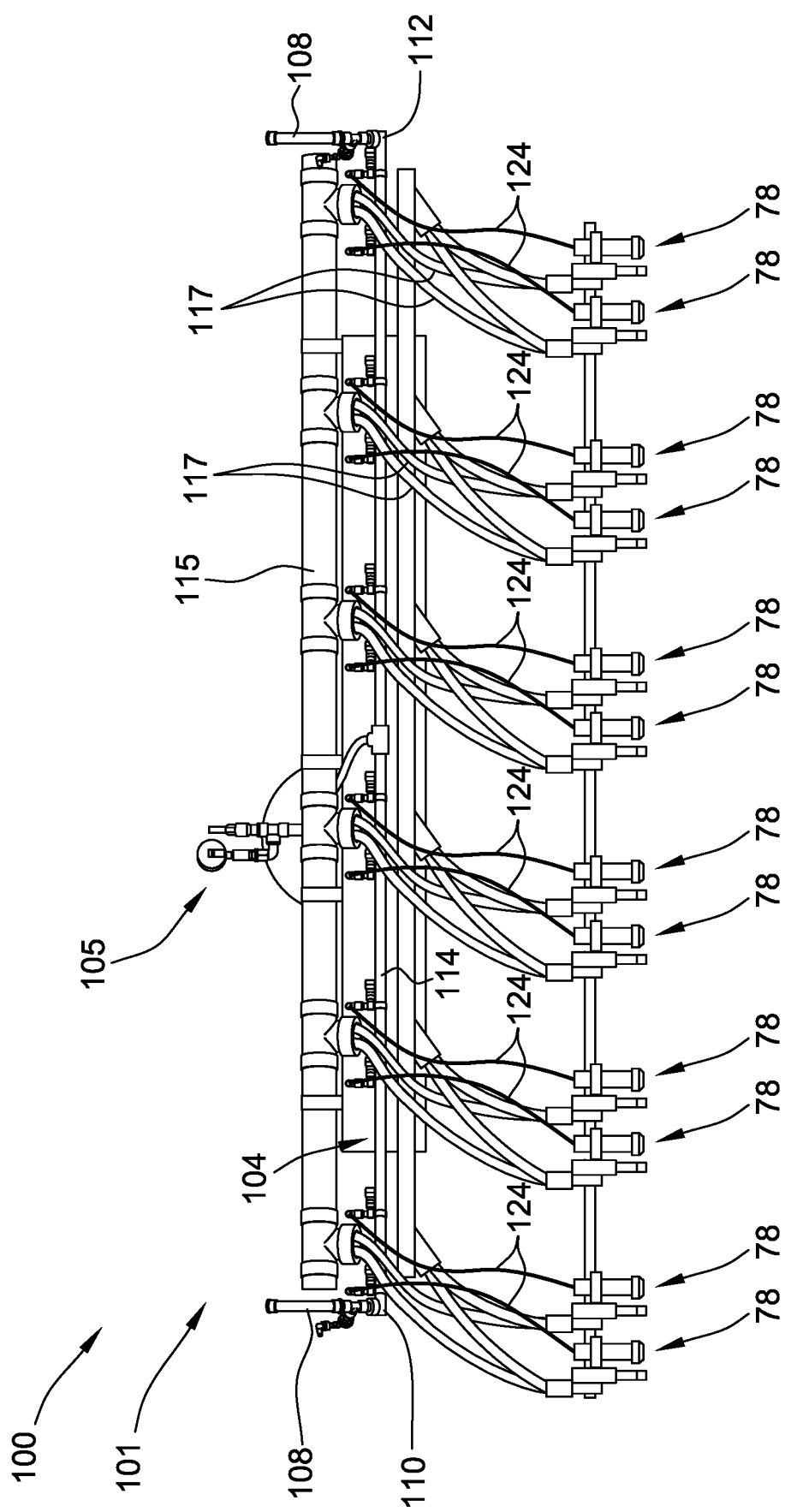
FIG. 4 is a rear view of a portion of the seed planting system of FIG. 1.

In the embodiment shown in FIG. 4, the seed planting system 100 also includes a vacuum manifold 115 connected to a vacuum source (not shown), and a plurality of vacuum conduits extending from the vacuum manifold 115 to a corresponding seed dispenser. Vacuum generated by the vacuum source is transmitted to the seed dispensers and selectively applied to a seed disc to grab and dispense seeds from a seed hopper.

Figure 5:
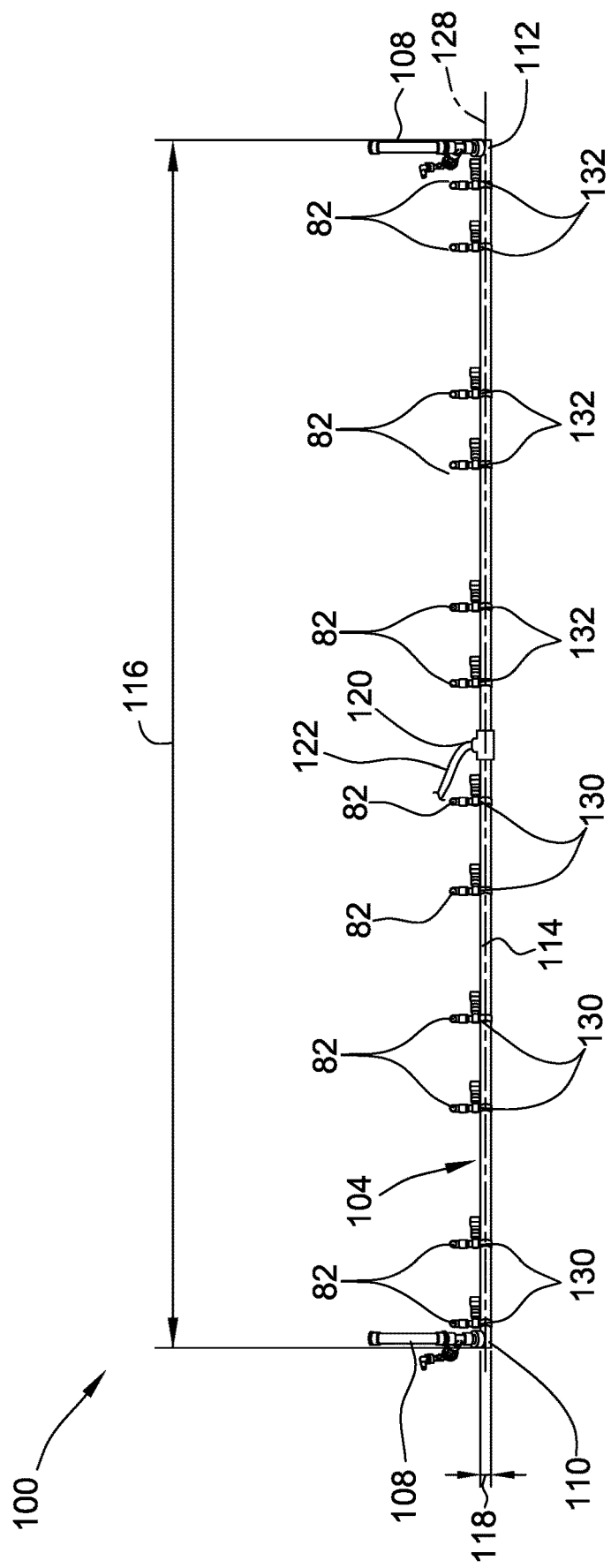
FIG. 5 is a rear view of a manifold of the seed planting system of FIG. 1.

As shown in FIG. 5, the manifold 104 extends a length 116 along a longitudinal axis 128 measured from the first end 110 of the manifold 104 to the second end 112 of the manifold 104, and has a diameter 118. The manifold may have any suitable length 116 and diameter 118 that enables the seed planting system 100 to function as described herein. For example, in some embodiments, the diameter 118 is between 1 centimeter and 5 centimeters, between 1.5 centimeters and 4 centimeters, or between 2 centimeters and 3 centimeters. In some embodiments, the diameter 118 is approximately 2.5 centimeters (1 inch). Moreover, in some embodiments, the length 116 of the manifold 104 is between 0.75 meters and 10 meters. In alternative embodiments, the manifold 104 is any size that enables the manifold 104 to function as described herein.

The manifold 104 also defines an inlet 120 to allow fluid F to flow into the internal passageway 106 of the manifold 104. A fluid supply conduit 122 is connected to the fluid inlet 120 for supplying fluid from a suitable fluid source (not shown), such as a fluid tank. In the illustrated embodiment, the inlet 120 is positioned on the manifold 104 approximately midway between the first end 110 and the second end 112. In other embodiments, the inlet 120 may be positioned anywhere along the manifold 104. In further embodiments, the seed planting system 100 may include a plurality of inlets. For example, a plurality of inlets may be evenly spaced along the manifold 104 between the first end 110 and the second end 112.

The manifold 104 also defines a plurality of outlets through which the fluid F flows out of the internal passageway 106. Specifically, the manifold 104 defines a plurality of first outlets 130 located between the inlet 120 and the first end 110, and a plurality of second outlets 132 located between the inlet 120 and the second end 112. Each of the first outlets 130 and the second outlets 132 is connected in fluid communication with one of the nozzles 80 to deliver fluid F thereto.

Figure 7:
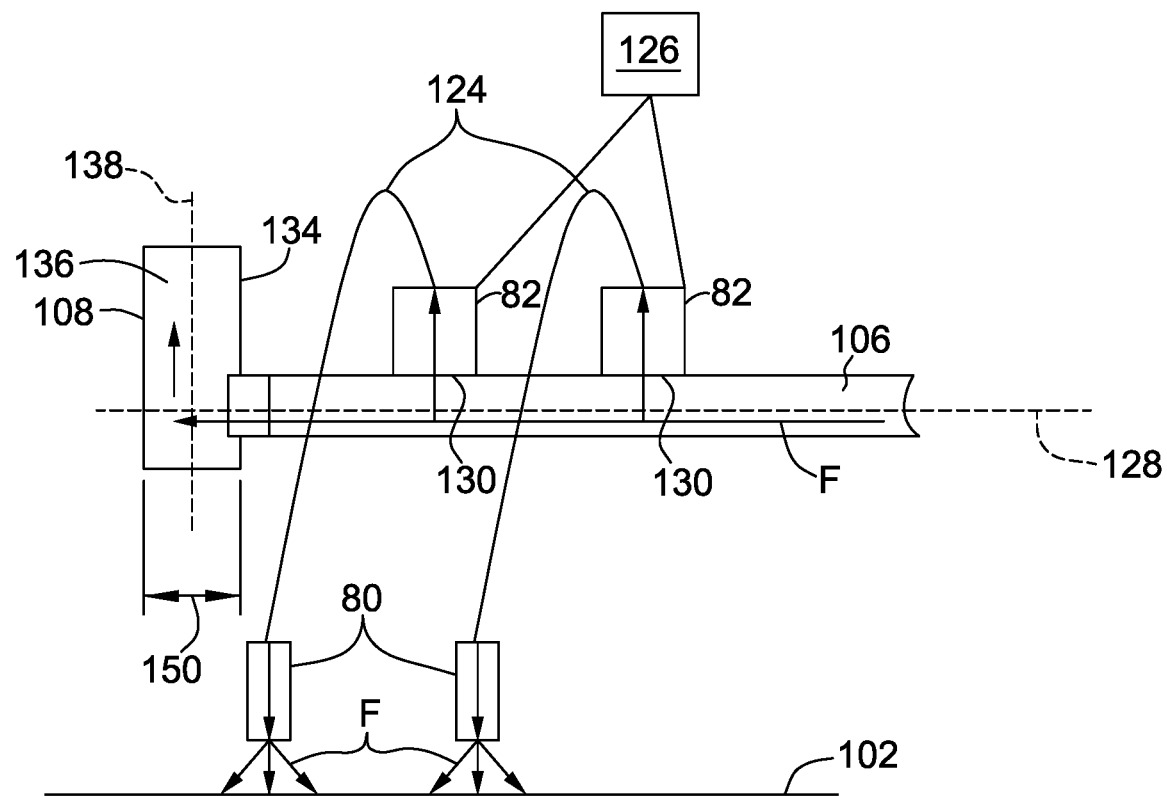
FIG. 7 is a schematic view of a portion of the seed planting system of FIG. 1 illustrating fluid flow therethrough.

As shown in FIGS. 5 and 7, the seed planting system 100 further includes a plurality of valves 82 configured to control fluid flow through corresponding nozzles 80. Each of the valves 82 is connected in fluid communication with one of the nozzles 80 by a fluid line 124 such that the valve 82 controls fluid flow through the nozzle 80. More specifically, each of the valves 82 is connected in fluid communication between the internal passageway 106 of the manifold 104 and a corresponding nozzle 80. Moreover, each of the valves 82 is associated with one of the first outlets 130 and the second outlets 132 such that the valve 82 controls fluid flow out of the associated first outlet 130 or second outlet 132. In the illustrated embodiment, each of the valves 82 is mounted on the manifold 104 adjacent one of the first outlets 130 and the second outlets 132, and each of the nozzles 80 is positioned below the manifold 104 proximate to the outlet end 54 of the seed tube 52 for spraying the fluid F on and/or adjacent to the seeds 46 dispensed from the seed tube 52. In alternative embodiments, the seed planting system 100 may include any nozzle assembly 78 that enables the seed planting system 100 to function as described herein. For example, in some embodiments, the valve 82 may be mounted to the body of the nozzle 80, such as by being secured to the nozzle 80 through a check valve port. Alternatively, the valve 82 may be integrated into a portion of the body of the nozzle 80 as shown, for example, in FIG. 3.

The valves 82 may have any suitable configuration that enables the seed planting system 100 to function as described herein. In some embodiments, each of the valves 82 is an electrically actuated valve, such as a solenoid valve, that can be controlled and/or regulated using a pulse-width modulated signal.

In the exemplary embodiment, the seed planting system 100 further includes a controller 126 (shown in FIG. 7) communicatively connected to each of the valves 82, and configured to control operation of the valves 82. Specifically, the controller 126 is configured to modulate the valves 82 between a closed position and an opened position to regulate fluid flow through the valves 82 and the nozzles 80. In particular, the fluid F is allowed to flow through the nozzles 80 when the valves 82 are in the opened position. When the valves 82 are in the closed position, the fluid F is inhibited from flowing through the nozzles 80. In some embodiments, each of the valves 82 controls fluid flow through a single nozzle 80, and the controller 126 is configured to individually modulate or control each of the valves 82. That is, the controller 126 may be configured to control the valves 82 independently of one another in some embodiments.

The controller 126 may generally comprise any suitable computer and/or other processing unit, including any suitable combination of computers, processing units and/or the like that may be operated independently or in connection within one another. Thus, in several embodiments, the controller 126 may include one or more processor(s) and associated memory device(s) configured to perform a variety of computer-implemented functions. As used herein, the term "processor" refers not only to integrated circuits, but also refers to a controller, a microcontroller, a microcomputer, a programmable logic controller (PLC), an application specific integrated circuit, and other programmable circuits. Additionally, the memory device(s) of the controller 126 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may generally be configured to store suitable computer-readable instructions that, when implemented by the processor(s), configure the controller 126 to perform various functions including, but not limited to, controlling the operation of the valves 82, determining the seed frequency of the seed meter 50, and/or various other suitable computer-implemented functions described herein.

In some embodiments, the seed planting system 100 may include a detector, such as sensor 88, that detects the location of each spray relative to the location of each seed 46 (shown in FIG. 2). In general, the detector may include any suitable sensor, camera, scanner and/or the like that is capable of automatically detecting the location of each spray/seed. Additionally, the detector may be communicatively coupled to the controller 126 such that the measurement/detection signals generated by the detector may be transmitted to the controller 126 for subsequent processing/analysis. For instance, in several embodiments, the controller 126 may be configured to analyze the signals received from the detector in order to determine the relative locations of each spray/seed, such as by comparing each seed location to its corresponding spray location in order to determine the spacing between each seed/spray.

As shown in FIGS. 4-7, the seed planting system 100 further includes a pair of pressure dampeners 108 coupled to the manifold 104. The pressure dampeners 108 are configured to dampen or attenuate pressure fluctuations within the fluid flow lines of the seed planting system 100, particularly within the internal passageway 106 defined by the manifold 104, to facilitate precise control of fluid flow out of the nozzles 80. One of the pressure dampeners 108 is coupled to the first end 110 of the manifold 104, and the other pressure dampener 108 is coupled to the second end 112 of the manifold 104. In other embodiments, the pressure dampeners 108 may be connected directly to one or more of the nozzle assemblies 78. For example, FIGS. 13 and 14, which are described below, show nozzle assemblies 79, 700 including pressure dampeners 81, 702.

Figure 6:
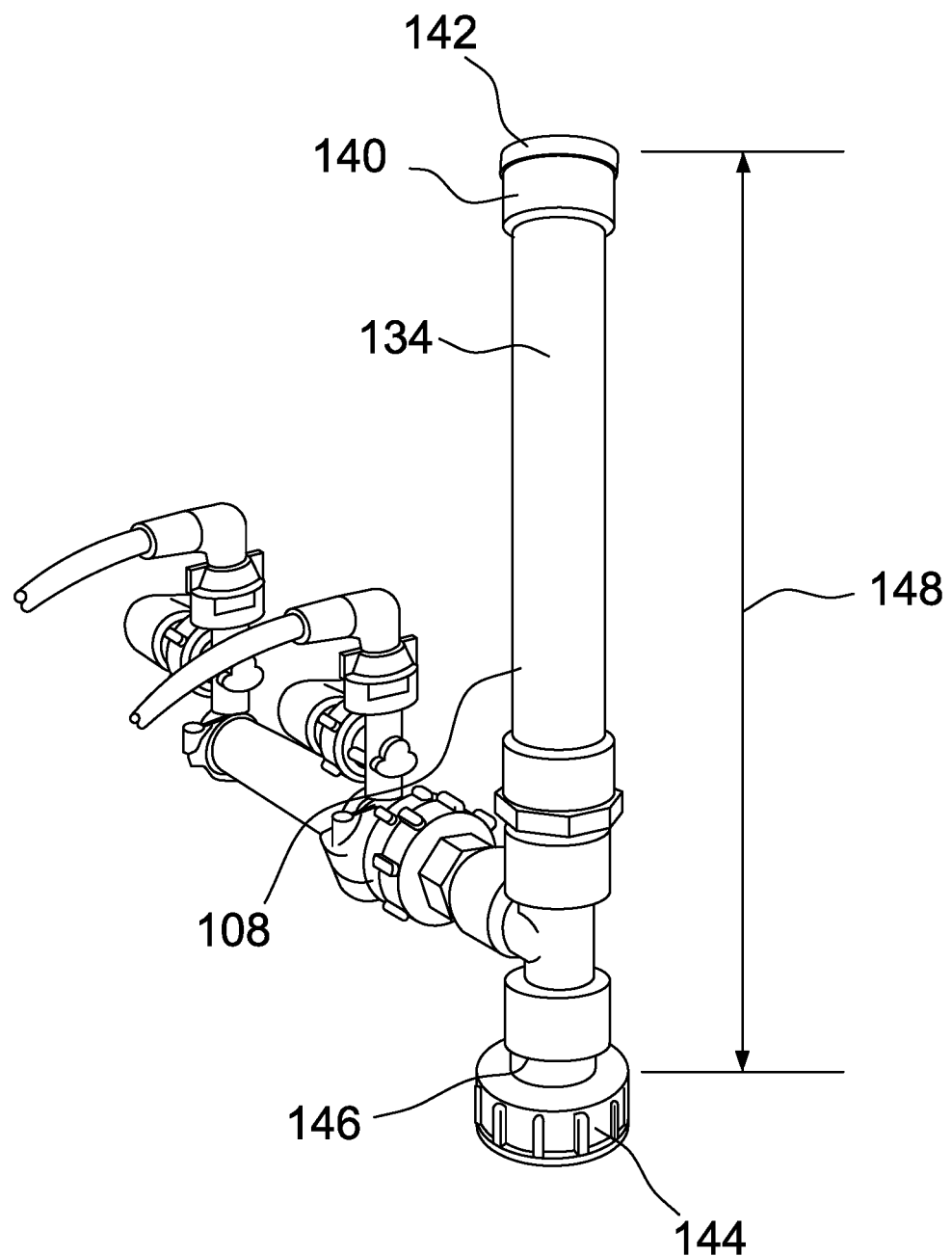
FIG. 6 is a perspective view of a pressure dampener of the seed planting system of FIG. 1.

In reference to FIGS. 6 and 7, each pressure dampener 108 includes a sidewall 134 defining a cavity 136. The pressure dampeners 108 are configured to contain gas in the cavity 136. The pressure dampeners 108 may contain any suitable gas that enables the pressure dampeners 108 to function as described herein. For example, in some embodiments, the gas includes oxygen, hydrogen, nitrogen, and combinations thereof. In some embodiments, the pressure dampeners 108 contain atmospheric air. Moreover, the pressure dampeners 108 are coupled to the manifold 104 in a manner that allows the fluid F within the internal passageway 106 to flow at least partially into the pressure dampeners 108 and/or to compress the gas within the cavity 136. Without being bound by any particular theory, it is believed that, by allowing fluid F within the internal passageway 106 to flow into the cavity 136 and/or compress gas within the cavity 136, pressure fluctuations of the fluid F, such as pressure waves, can be transferred to the gas within the cavity 136, thereby causing the gas to experience changes in pressure and inhibiting the fluid F from experiencing substantial changes in pressure in response to system changes, such as the modulation of valves 82. For example, the pressure dampeners 108 inhibit pressure waves from reflecting or "rebounding" off of solid or capped ends of the manifold 104, and propagating back through the fluid F within the internal passageway. As a result, the pressure dampeners 108 inhibit fluctuations in the fluid pressure of the fluid F.

The pressure dampeners 108 may have any suitable shape that enables the pressure dampeners 108 to function as described herein. In the illustrated embodiment, each pressure dampener 108 has a cylindrical shape. Also, each pressure dampener 108 is connected to the manifold 104 such that the pressure dampener 108 extends vertically upwards from the manifold 104, and such that a central longitudinal axis 138 of the pressure dampener 108 is substantially perpendicular to the longitudinal axis 128 of the manifold 104. Accordingly, in the illustrated embodiment, each pressure dampener 108 is configured as a standpipe.

A cap 140 covers an upper end 142 of each pressure dampener 108, and seals off the cavity 136 to inhibit gases from escaping the cavity 136. The cap 140 may be sealingly joined to the sidewall 134 of the pressure dampener 108 in any suitable manner that enables the pressure dampener 108 to function as described herein. For example, in some embodiments, an adhesive is used to sealingly join the cap 140 to the sidewall 134. In further embodiments, the cap 140 is welded to the sidewall 134.

In the exemplary embodiment, a drain 144 is connected to a lower end 146 of the pressure dampener 108. The drain 144 is positionable in opened and closed positions to facilitate draining the fluid F from the manifold 104. In alternative embodiments, the pressure dampeners may have any configuration that enables the seed planting system 100 to function as described herein. For example, in some embodiments, the drain 144 is omitted from at least one of the pressure dampeners 108.

Each pressure dampener 108 has a length 148 extending in the vertical direction and measured from the upper end 142 of the pressure dampener to the lower end 146 of the pressure dampener 108. The pressure dampeners 108 may have any suitable length 148 that enables the pressure dampeners 108 to function as described herein. For example, in some embodiments, the length 148 of each pressure dampener 108 is between 1 centimeter and 100 centimeters, between 2 centimeters and 50 centimeters, or between 5 centimeters and 30 centimeters. In other embodiments, the length 148 of each pressure dampener 108 is between 20 centimeters and 40 centimeters. In other embodiments, the length 148 of each pressure dampener 108 is between 10 centimeters and 30 centimeters. In some embodiments, the length 148 of each pressure dampener 108 is approximately 23 centimeters (9 inches). Each pressure dampener 108 also has a width or diameter 150 defined by the sidewall 134. The pressure dampeners 108 may have any suitable width 150 that enables the pressure dampeners 108 to function as described herein. For example, in some embodiments, the width 150 of each pressure dampener 108 is between 0.5 inches and 10 inches, between 1 inch and 8 inches, or between 1.5 inches and 5 inches. In other embodiments, the width 150 of each pressure dampener 108 is between 2 inches and 4 inches. In other embodiments, the width 150 of each pressure dampener 108 is between 1 inch and 3 inches. In some embodiments, the width 150 of each pressure dampener 108 is approximately 2.5 centimeters (1 inch).

The cavity 136 of each pressure dampener 108 also has a volume. In some embodiments, the volume of each cavity 136 is sized based on the volume of the manifold 104 on which the pressure dampeners 108 are used. That is, in some embodiments, the volume of each cavity 136 is proportional to a volume of the internal passageway 106. Suitably, the pressure dampeners 108 are sized such that the volume of the cavities 136 accommodates an amount of gas and/or fluid F sufficient to inhibit significant pressure fluctuations within internal passageway 106. In some embodiments, the ratio of the combined volume of the cavities 136 of each pressure dampener 108 to the volume of the internal passageway 106 is between 1:40 and 3:10, between 1:20 and 1:4, or between 1:10 and 1:5. In other embodiments, the ratio of the combined volume of the cavities 136 of each pressure dampener 108 to the volume of the internal passageway 106 is between 1:10 and 3:10. In other embodiments, the ratio of the combined volume of the cavities 136 of each pressure dampener 108 to the volume of the internal passageway 106 is between 1:40 and 1:5. In some embodiments, the ratio of the combined volume of the cavities 136 of each pressure dampener 108 to the volume of the internal passageway 106 is approximately 3:20. In other embodiments, the cavities 136 may have any suitable volume that enables the seed planting system 100 to function as described herein.

Also, the pressure dampeners 108 may be made of any suitable materials such as metals, plastics, and/or combinations thereof. In the exemplary embodiment, each pressure dampener 108 is made of plastic. In particular, each pressure dampener 108 is made of polyvinyl chloride (PVC). In alternative embodiments, the pressure dampener 108 is made of stainless steel and/or polypropylene.

Likewise, the manifold 104 may be made of any suitable materials such as metals, plastics, and/or combinations thereof. In the exemplary embodiment, the manifold 104 is made of metal. In particular, the manifold 104 is made of stainless steel. In alternative embodiments, the manifold 104 is made of polyvinyl chloride (PVC) and/or polypropylene. Moreover, the manifold 104 may have a rigid construction such that the manifold maintains its shape (i.e., does not bend or sag under its own weight). In other embodiments, the manifold 104 may have a relatively flexible construction and/or include or more flexible conduits, such as hoses.

Figure 8:
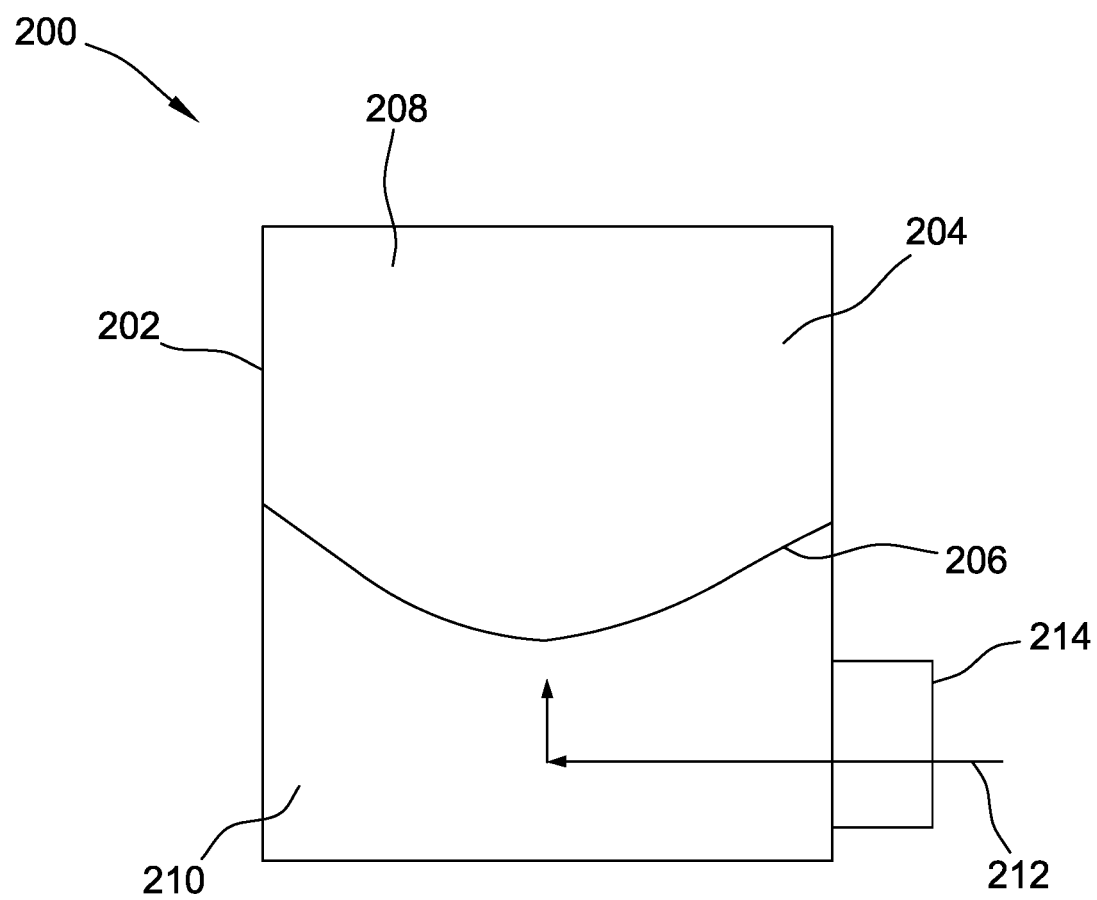
FIG. 8 is a schematic view of another embodiment of a pressure dampener suitable for use in the seed planting system of FIG. 1.

FIG. 8 is a schematic view of another embodiment of a pressure dampener 200 suitable for use in the seed planting system 100. As shown in FIG. 8, the pressure dampener 200 includes a sidewall 202 defining a cavity 204, and a membrane 206 that separates the cavity 204 into a first compartment 208 and a second compartment 210. In some embodiments, the first compartment 208 contains a pressurized gas. In some embodiments, the pressurized gas may be maintained at a desired pressure by an external compressor (not shown) or other suitable device. In other embodiments, the pressure within the first compartment 208 may be set at an initial or nominal pressure, and fluctuate during use based on pressure fluctuations within the second compartment 210 resulting from fluid flow through the internal passageway 106 of the manifold 104.

The pressure dampener 200 is coupleable to first end 110 and/or second end 112 of manifold 104 such that the second compartment 210 is in fluid communication with the internal passageway 106 defined by the manifold 104. The membrane 206 is flexible and separates the gas in gas compartment 208 from fluid 212 that flows through the internal passageway 106 and/or into the second compartment 210 of the pressure dampener 200. In further embodiments, the membrane 206 encloses the gas compartment 208, e.g. forms a bladder, to facilitate maintaining the pressurized gas at the desired pressure. In other embodiments, the pressure dampener 200 may have any configuration that enables the pressure dampener 200 to function as described herein.

Pressure dampener 200 reduces pressure fluctuations of fluid 212 flowing through the manifold 104 (shown in FIG. 1) when the pressure dampener 200 is connected to the manifold 104 (shown in FIG. 1). During operation, the fluid 212 flows into the pressure dampener 200 through an inlet 214. The fluid 212 contacts and displaces the membrane 206, which is flexible, such that the pressurized gas is compressed. Accordingly, the fluid pressure of the fluid 212 remains substantially constant and the pressurized gas absorbs variations in pressure.

In reference to FIGS. 1-4 and 7, during operation of the seed planting system 100, the vehicle 10 moves the planter 12 along rows of the field 102 and the row unit 14 creates a furrow 38 within the field 102. The seed meter 50 transfers the seeds 46 from the seed hopper 48 to the seed tube 52. The seeds 46 then travel through the seed tube 52 and are dispensed from the outlet end 54 of the seed tube 52 into the furrow 38. The valves 82 of the nozzle assemblies 78 are modulated to dispense fluid on and/or adjacent to each seed 46 as it is dispensed from seed tube 52. In some embodiments, each valve 82 of each nozzle assembly 78 is controlled or modulated independently of other valves 82 to dispense fluid through the associated nozzle assembly 78. Further, in some embodiments, the valves 82 are modulated by controller 126 in response to controller 126 detecting a seed being dispensed through the seed tube 52. As the valves 82 are modulated between the closed and opened positions, fluid F flows out of the internal passageway 106 defined by the manifold 104 and through nozzle assemblies 78 associated with the valves 82 being modulated.

Fluid is supplied to the internal passageway 106 of manifold 104 through the inlet 120 via the fluid supply conduit 122. The fluid F flows into the internal passageway 106 through the inlet 120, and then flows parallel to the longitudinal axis 128 of the manifold 104 toward the first end 110 and the second end 112. At least a portion of the fluid F flows through the first outlets 130 and the second outlets 132 and towards the nozzle assemblies 78 as the valves 82 of the nozzle assemblies 78 modulate. Further, as the valves 82 modulate, pressure waves are imparted to the fluid F within the internal passageway 106 due to the rapid opening and closing of the valves 82. The pressure waves imparted to the fluid F propagate primarily along the longitudinal axis 128 of the manifold 104, toward the first end 110 and the second end 112 of the manifold 104. When the pressure waves reach the pressure dampeners 108 at the first end 110 and the second end 112 of the manifold 104, gas within the cavities 136 of the pressure dampeners 108 expands or contracts to absorb the pressure wave from the fluid F. As a result, fluctuations in fluid pressure of the fluid F within the internal passageway 106 are reduced, which facilitates controlling the flow of the fluid F through the nozzle assemblies 78.

It should be understood that features and aspects of the seed planter system are not limited to use with seed planters, and may be used in other fluid application systems. For example, the pressure dampeners 108 may be implemented in other agricultural fluid application systems, such as liquid fertilizer application systems and agricultural sprayer systems.

Figure 9:
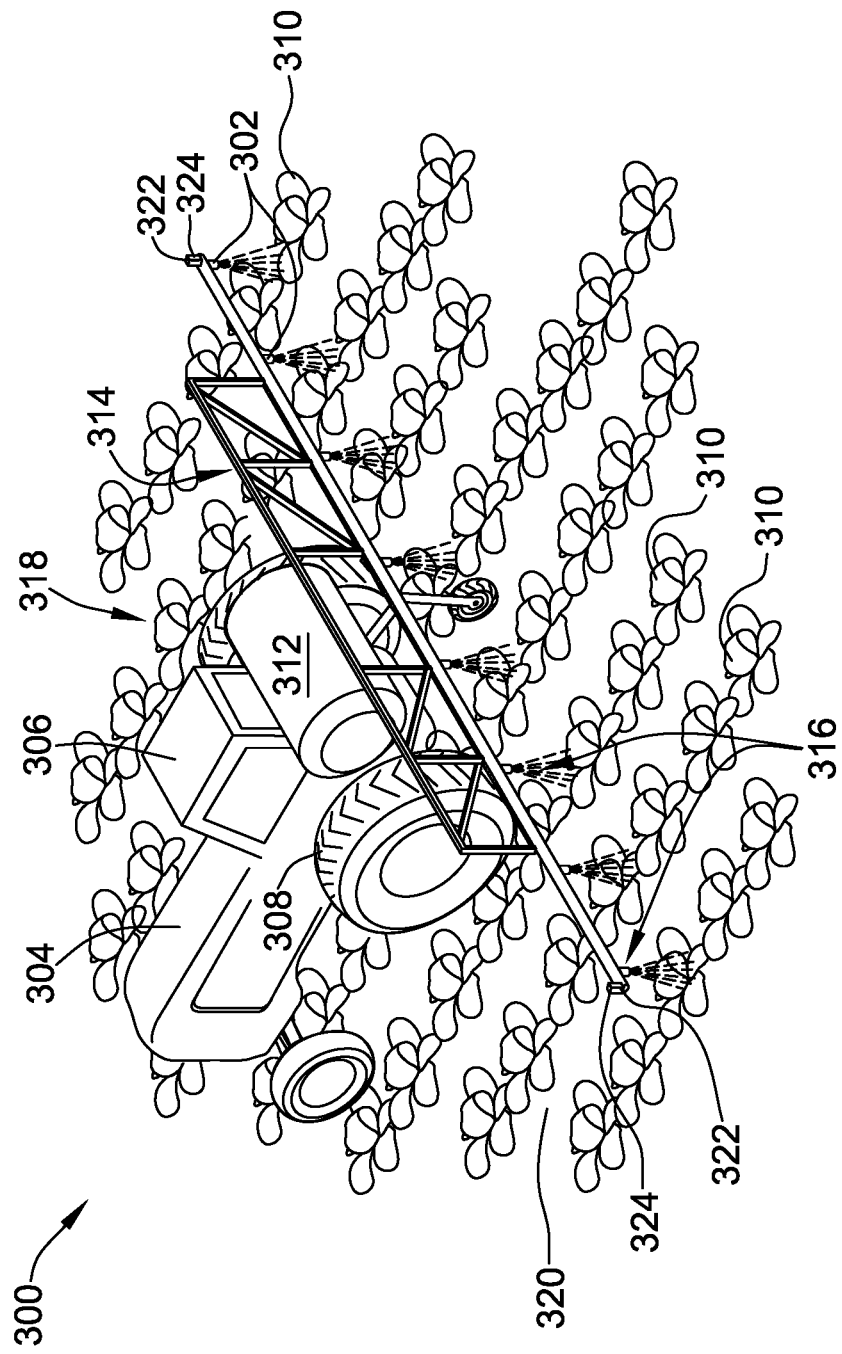
FIG. 9 is a perspective view of an exemplary embodiment of a fluid application system.

FIG. 9 is a perspective view of an exemplary fluid application system 300, shown in the form of a sprayer system. The sprayer system shown in FIG. 9 is a tractor mounted sprayer system, though features and aspects of the present disclosure may be implemented on any type of sprayer system including, for example and without limitation, self-propelled sprayer systems. Fluid application system 300 includes a plurality of nozzle assemblies 302, a motorized vehicle 304 having a cab 306, a plurality of wheels 308, a tank or reservoir 312, and a boom pipe or manifold 314 with the plurality of nozzle assemblies 302 installed thereon. The tank 312 may hold a fluid 316 including a liquid, a mixture of liquid and powder, and/or any other suitable product. For example, the fluid 316 can include a quantity of water or an agrochemical such as a fertilizer or a pesticide. The fluid 316 may be sprayed from the nozzle assemblies 302 onto a crop, a product, and/or the ground 318. The manifold 314 may have substantially the same configuration as the manifold 104 described above with reference to FIGS. 1-7.

In some embodiments, each of the nozzle assemblies 302 includes an electrically actuated valve, such as the valve 82 described above with reference to FIGS. 3-7. The valves may be controlled or regulated by a suitable controller, such as the controller 126, to modulate the valves between open and closed positioned and provide selective fluid flow through desired nozzle assemblies 302. In some embodiments, the valves are modulated using pulse-width modulated signals.

In the exemplary embodiment, the fluid storage tank 312 is connected to the manifold 314 such that the fluid 316 from the tank 312 is directed into the manifold 314. The manifold 314 is connected to the nozzle assemblies 302 such that the fluid 316 flows out of the manifold 314 into the nozzle assemblies 302 for spraying on the ground. In suitable embodiments, the fluid application system 300 may include any number of nozzle assemblies 302. In some embodiments, the vehicle 304 moves the fluid application system 300 along a desired path for fluid application, such as rows 310 of a field 320, as the fluid 316 is emitted from the nozzle assemblies 302.

Fluid application system 300 further includes a plurality of pressure dampeners 322 connected to opposite ends of the manifold 314. The pressure dampeners 322 may have the same configuration and operate in the same manner as the pressure dampeners 108 described above with reference to FIGS. 1-7, or the pressure dampeners 200 described above with reference to FIG. 8. For example, in some embodiments, each pressure dampener 322 includes a wall 324 defining a cavity that holds a compressible fluid such as a gas. The pressure dampeners 322 are in flow communication with the manifold 314 such that a portion of the fluid 316 may enter the cavities and/or compress gas within the cavities. As described above, the configuration and arrangement of the pressure dampeners 322 facilitate reducing pressure fluctuations of the fluid 316 flowing through the manifold 314. Moreover, the pressure dampeners 322 facilitate the fluid 316 being discharged from the nozzle assemblies 302 in a controlled and consistent manner.

Figure 10:
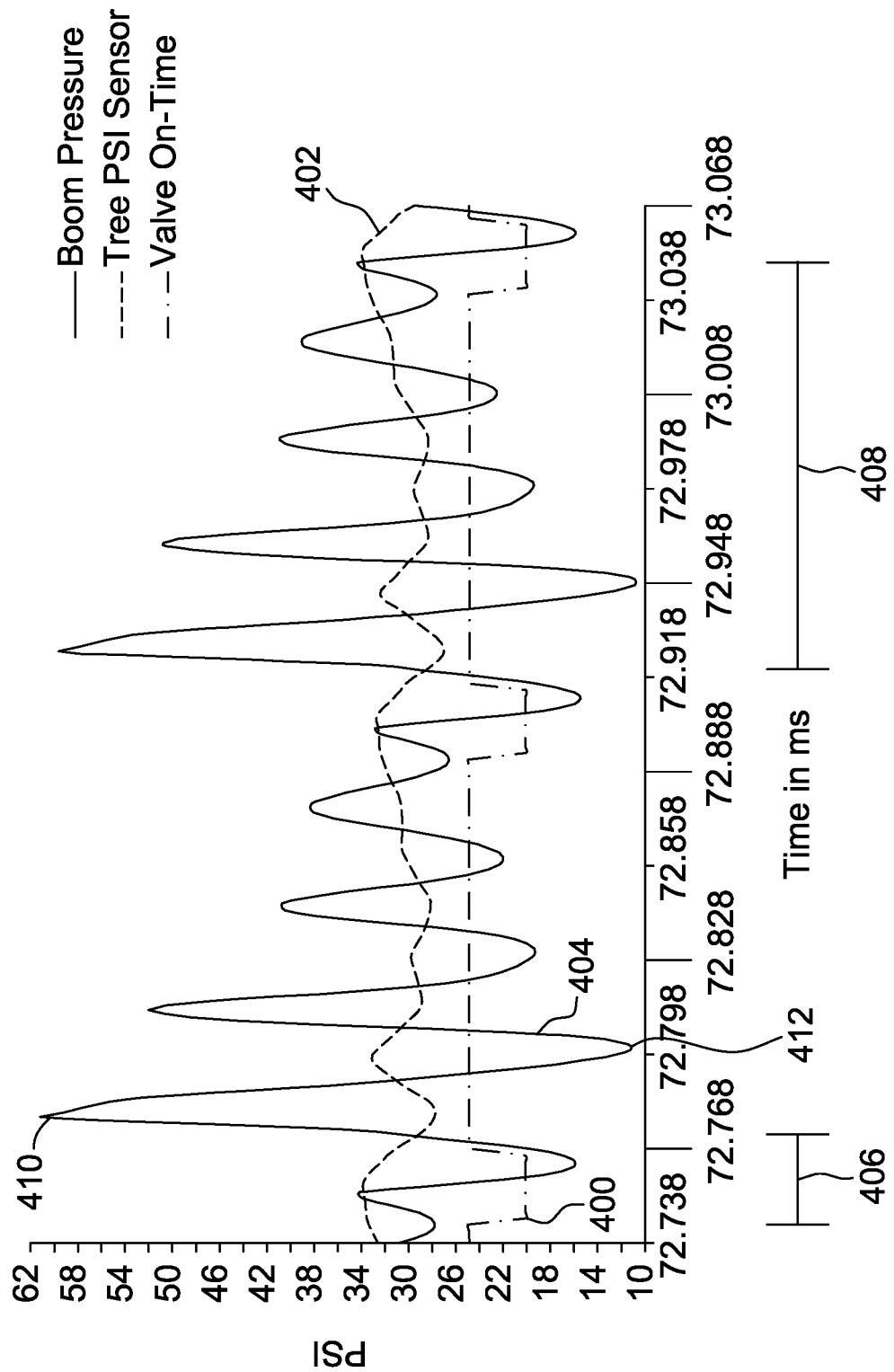
FIG. 10 is a graph showing fluid pressure within a fluid passageway of a manifold without a pressure dampener.

FIG. 10 is a graph showing fluctuations of fluid pressure within a fluid passageway of a manifold connected to a plurality of nozzles and a plurality of electrically actuated valves. Fluid is supplied to the manifold from a fluid supply tank with a pump set to achieve a target pressure within the manifold of 30 pounds per square inch. The graph shown in FIG. 10 illustrates pressure fluctuations within a manifold without pressure dampeners. The graph includes an X-axis defining time in milliseconds and a Y-axis defining pressure in pounds per square inch (psi). The graph further includes a valve actuation curve 400, a supply pressure curve 402, and a manifold pressure curve 404. The valve actuation curve 400 illustrates modulation of a plurality of valves that control fluid flow from the manifold towards nozzles fluidly coupled to the manifold. The valves modulate between an opened position, indicated by region 406 on the valve actuation curve 400, and a closed position, indicated by region 408 on the valve actuation curve 400. While the valves are in the opened position, the fluid is discharged from the manifold. The graph shown in FIG. 10 illustrates pressure fluctuations within the manifold when all of the valves are opened and closed simultaneously.

The supply pressure curve 402 illustrates the fluid pressure of the fluid that is supplied to the manifold. The supply pressure curve 402 is generated from pressures measured by a sensor located upstream of the manifold. The manifold pressure curve 404 illustrates the fluid pressure of the fluid flowing through the manifold. The manifold pressure curve 404 is generated from pressures measured by a sensor connected to or positioned within the manifold. As shown in FIG. 10, the supply pressure curve 402 and the manifold pressure curve 404 differ greatly as the electrically actuated valves are actuated between opened and closed position. In particular, the manifold pressure curve 404 has a greater range or variance between high pressures (i.e., pressure peaks 410) and low pressures (i.e., pressure valleys 412) than the supply pressure curve 402. As shown in FIG. 10, the pressure within the manifold varies from about 11 psi up to about 61 psi, whereas the pressure upstream of the manifold varies from about 27 psi up to about 34 psi. The pressure fluctuations within the manifold between the peaks 410 and the valleys 412 reduce the precision with which the fluid can be discharged from the manifold through the nozzles.

Figure 11:
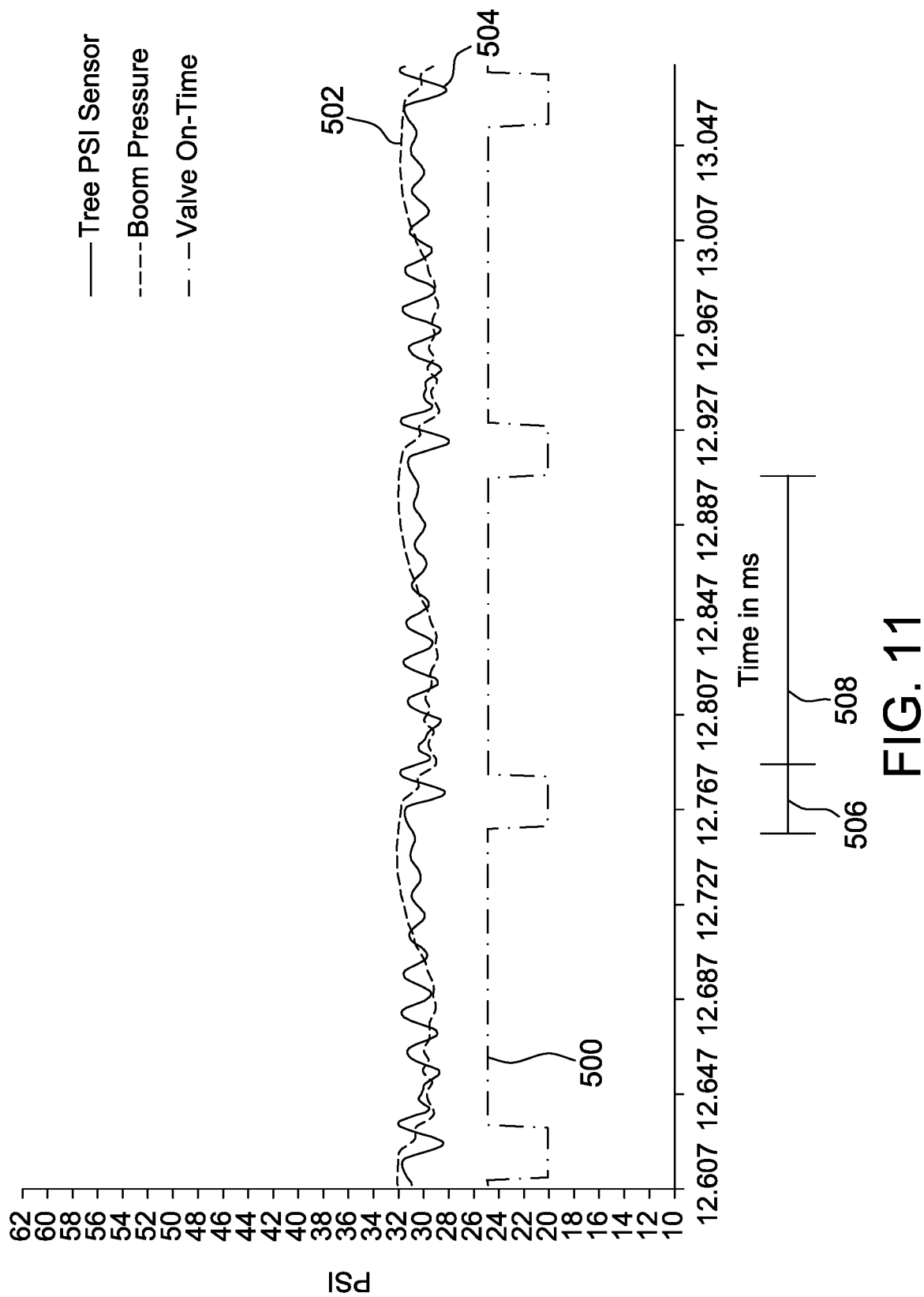
FIG. 11 is a graph showing fluid pressure within the fluid passageway defined by the manifold shown in FIG. 5 while the seed planting system is stationary.

FIG. 11 is a graph showing fluctuations of fluid pressure within the fluid passageway 106 defined by the manifold 104 during operation. Fluid is supplied to the manifold 104 from a fluid supply tank with a pump set to achieve a target pressure within the manifold of 30 pounds per square inch. The graph shown in FIG. 11 illustrates pressure fluctuations within the manifold 104 including the pressure dampeners 108. The graph includes an X-axis defining time in milliseconds and a Y-axis defining pressure in psi. The graph further includes a valve actuation curve 500, a supply pressure curve 502, and a manifold pressure curve 504. The valve actuation curve 500 illustrates modulation of the valves 82 that control fluid discharge from the manifold 104. The valves 82 modulate between an opened position, indicated by region 506 on the valve actuation curve 500, and a closed position, indicated by region 508 on the valve actuation curve 500. While the valves 82 are in the opened position, the fluid F is discharged from the manifold 104 and flows through the nozzles 80. The graph shown in FIG. 11 illustrates pressure fluctuations within the manifold 104 when all of the valves 82 are opened and closed simultaneously, and while the system is stationary.

The supply pressure curve 502 illustrates the fluid pressure of the fluid F that is supplied to the manifold 104. The supply pressure curve 502 is generated from pressures measured by a sensor (not shown) located upstream of the manifold 104. The manifold pressure curve 504 illustrates the fluid pressure of the fluid F flowing through the manifold 104. The manifold pressure curve 504 is generated from pressures measured by a sensor (not shown) connected to or positioned within the manifold 104. As shown in FIGS. 10 and 11, the fluctuations of fluid pressure within the manifold 104 including the pressure dampeners 108, represented by the manifold pressure curve 504, are significantly reduced as compared to the pressure fluctuations within the manifold without pressure dampeners, represented by the manifold pressure curve 404 (shown in FIG. 10). In particular, the ranges between peak pressures and low pressures are reduced. Specifically, the pressure within the manifold 104 only varies from about 28 psi up to about 32 psi, or within ±2 psi from the target operating pressure of 30 psi. Moreover, the manifold pressure curve 504 substantially conforms to the supply pressure curve 502. Thus, the pressure dampeners 108 facilitate reducing pressure fluctuations within the manifold 104 resulting from changes in system operating conditions, such as the modulation of valves 82, and thereby facilitate more precise control over fluid application rates and fluid flow rates through nozzles.

Figure 12:
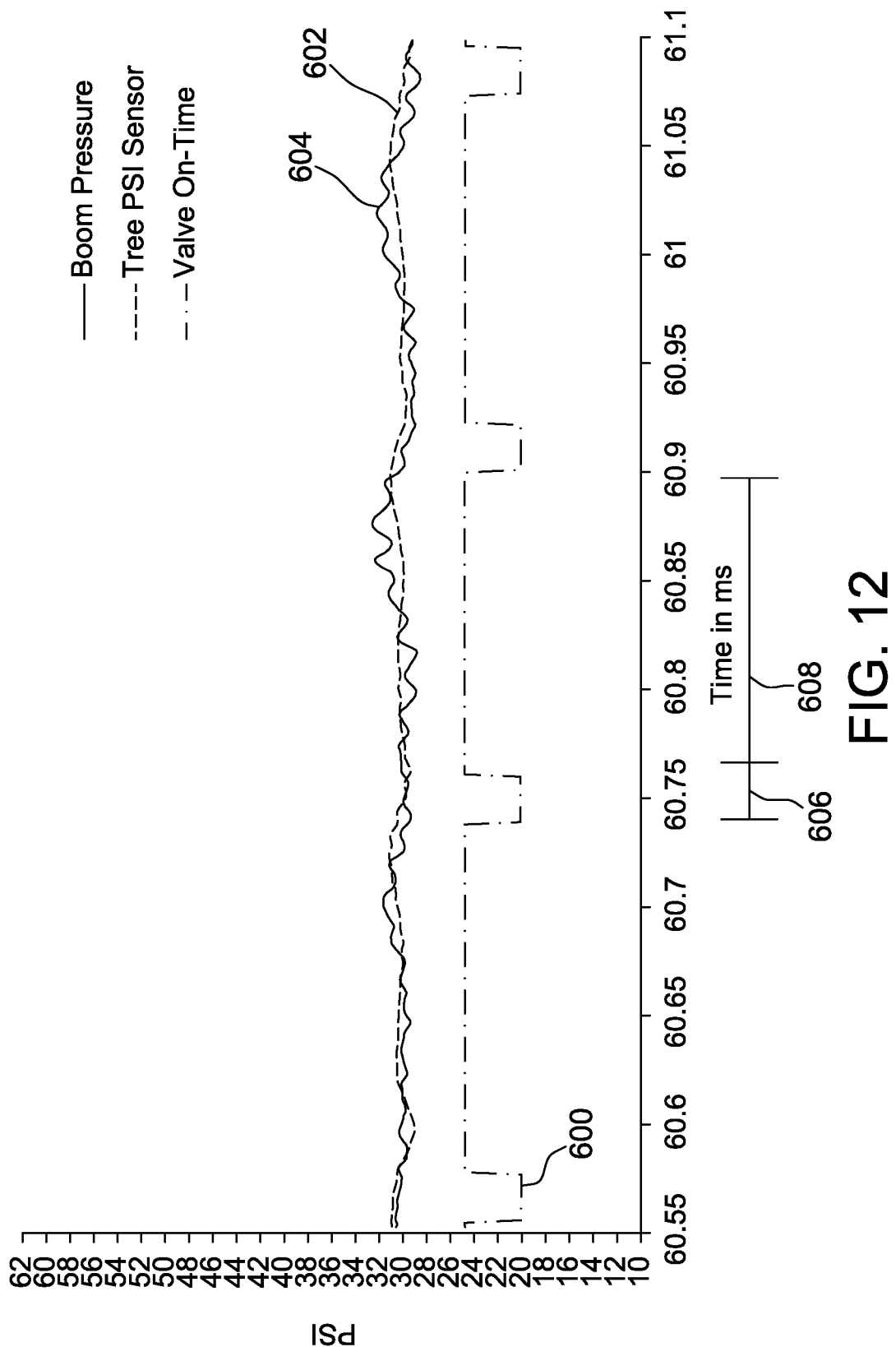
FIG. 12 is a graph showing fluid pressure within the fluid passageway defined by the manifold shown in FIG. 5 while the seed planting system moves across a field.

FIG. 12 is a graph showing fluctuations of fluid pressure within the fluid passageway 106 defined by the manifold 104 while the seed planting system 100 is moved across a field during operation. Fluid is supplied to the manifold 104 from a fluid supply tank with a pump set to achieve a target pressure within the manifold 104 of 30 pounds per square inch. The graph shown in FIG. 12 illustrates pressure fluctuations within the manifold 104 including the pressure dampeners 108. The graph includes an X-axis defining time in milliseconds and a Y-axis defining pressure in psi. The graph further includes a valve actuation curve 600, a supply pressure curve 602, and a manifold pressure curve 604. The valve actuation curve 600 illustrates modulation of the valves 82 that control fluid discharge from the manifold 104. The valves 82 modulate between an opened position, indicated by region 606 on the valve actuation curve 600, and a closed position, indicated by region 608, on the valve actuation curve 600. While the valves 82 are in the opened position, the fluid F is discharged from the manifold 104 and flows through the nozzles 80. The graph shown in FIG. 12 illustrates pressure fluctuations within the manifold 104 when all of the valves 82 are opened and closed simultaneously, and while the system is moving.

The supply pressure curve 602 illustrates the fluid pressure of the fluid F that is supplied to the manifold 104. The supply pressure curve 602 is generated from pressures measured by a sensor (not shown) located upstream of the manifold 104. The manifold pressure curve 604 illustrates the fluid pressure of the fluid F flowing through the manifold 104. The manifold pressure curve 604 is generated from pressures measured by a sensor (not shown) connected to or positioned within the manifold 104. As shown in FIGS. 10 and 12, the fluctuations of fluid pressure within the manifold 104 including the pressure dampeners 108, represented by the manifold pressure curve 604 are significantly reduced as compared to the pressure fluctuations within the manifold without pressure dampeners, represented by the manifold pressure curve 404 (shown in FIG. 10). In particular, the ranges between peak pressures and low pressures are reduced. Specifically, the pressure within the manifold 104 only varies from about 28 psi up to about 32 psi, or within ±2 psi from the target operating pressure of 30 psi. Moreover, the manifold pressure curve 604 substantially conforms to the supply pressure curve 602. Thus, the pressure dampeners 108 facilitate reducing pressure fluctuations within the manifold 104 resulting from changes in system operating conditions, such as the modulation of valves 82, and thereby facilitate more precise control over fluid application rates and fluid flow rates through the nozzles 80.

Figure 13:
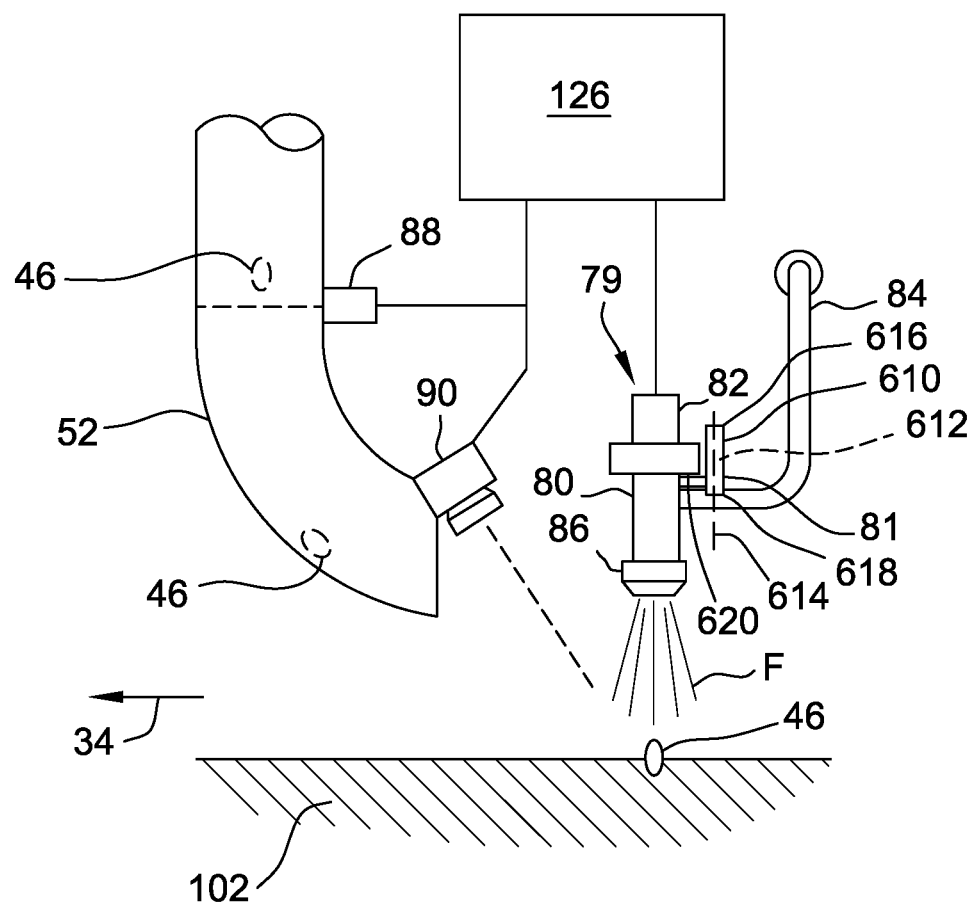
FIG. 13 is a schematic view of a portion of the seed planting system of FIG. 1 including a nozzle assembly having an integrated pressure dampener.

FIG. 13 is a schematic view of a portion of the seed planting system 100 shown in FIG. 1 including an embodiment of a nozzle assembly 79 having an integrated pressure dampener 81. Nozzle assembly 79 may be used in a variety of fluid application systems including, for example and without limitation, the seed planting system 100 (shown in FIG. 1) and the fluid application system 300 (shown in FIG. 9). For example, the row unit 14 (shown in FIG. 2) and/or seed planting system 100 may include a plurality of nozzle assemblies 79 for spraying a fluid F on and/or adjacent to the seeds 46 dispensed from the seed tubes 52. The nozzle assemblies 79 have substantially the same configuration as the nozzle assemblies 78 shown and described above, except each nozzle assembly 79 includes an integrated pressure dampener 81. For example, each of the nozzle assemblies 79 may be connected in flow communication with the manifold 104 (shown in FIG. 4), and include an electrically actuated valve 82, such as a solenoid valve, mounted to or integrated within a portion of a nozzle 80 of the nozzle assembly 79 to control the flow of the fluid F received from the manifold 104 by the nozzle assembly 79. The fluid F is discharged from the nozzle assembly 79 to the field through the spray tip, broadly a spray outlet, 86 of the nozzle assembly 79.

The controller 126 (shown in FIG. 7) may be communicatively connected to each of the plurality of electrically actuated valves 82 of the nozzle assemblies 79. The controller 126 may be configured to control the plurality of electrically actuated valves 82 independently of one another. Each pressure dampener 81 is connected in fluid communication with a respective fluid passage (e.g., fluid passage 706, shown in FIG. 14) of the nozzle assembly 79 upstream of the respective electrically actuated valve 82, and is configured to dampen fluctuations in fluid pressure within the fluid passage and the internal passageway of the manifold 104. Specifically, each of the pressure dampeners 81 acts as a spring or energy storage device that provides hysteretic dampening.

Each pressure dampener 81 may have substantially the same configuration as the pressure dampener 108 or the pressure dampener 200 shown and described above, except each pressure dampener 81 is sized and arranged to be integrated into one of the nozzle assemblies 79. In the illustrated embodiment, each pressure dampener 81 is a standpipe and includes a sidewall 610 defining a cavity 612 having a volume containing gas therein. In the illustrated embodiment, the sidewall 610 forms a substantially cylindrical shape, although the pressure dampener 81 may have any suitable shape that enables the nozzle assembly 79 to function as described herein. In the illustrated embodiment, the sidewall 610 extends around and along a vertical axis 614, in reference to the orientation shown in FIG. 13, from an upper end 616 to a lower end 618. In some embodiments, when the pressure dampener 81 is incorporated into the nozzle assembly 79 of a seed planting system 100 or other fluid application system, the pressure dampener 81 is oriented vertically and perpendicular to a travel direction 34 of the fluid application system. In other words, the vertical axis 614 of the pressure dampener 81 is oriented perpendicular to both the travel direction 34 of the fluid application system and the field 102 to which fluid is being applied. The upper end 616 and the lower end 618 of the pressure dampener 81 are closed. An opening defined in the sidewall 610 proximate the lower end 618 is connected to the nozzle 80 by an inlet 620. Accordingly, gas is confined or trapped in an upper portion of the cavity 612.

Figure 14:
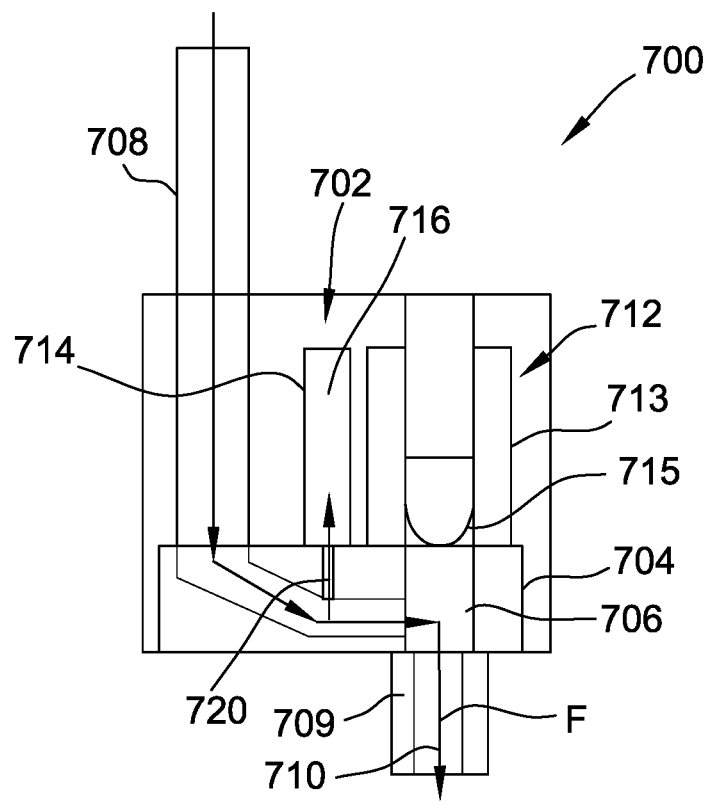
FIG. 14 is a schematic sectional view of another embodiment of a nozzle assembly suitable for use in the seed planting system of FIG. 1 or the fluid application system shown in FIG. 9.

FIG. 14 is a schematic sectional view of another embodiment of a nozzle assembly 700 suitable for use in the seed planting system 100 (shown in FIG. 1) or the fluid application system 300 (shown in FIG. 9). The nozzle assembly 700 includes a pressure dampener 702, a nozzle assembly body 704 defining a fluid passage 706, an inlet 708 for fluid F to flow into the fluid passage 706, a nozzle 709 defining a spray outlet 710 for discharging fluid from the fluid passage 706 to the exterior of the nozzle assembly 700, and a valve 712.

The nozzle assembly body 704 includes a base structure that defines the fluid passage 706 extending from the inlet 708 to the spray outlet 710. The base structure of the nozzle assembly body 704 may include suitable couplers or connectors (e.g., threads) that allow other components of the nozzle assembly 700 to be coupled thereto, such as the inlet 708, the nozzle 709, and the valve 712. Moreover, the nozzle assembly body 704 may include or be constructed of more than one component. In some embodiments, for example, the nozzle assembly body 704 includes at least a portion of a nozzle body and a valve body.

The valve 712 is configured to control fluid flow through the fluid passage 706 of the nozzle assembly 700. The valve 712 may be an electrically actuated valve including a solenoid coil 713 and a movable poppet 715. Each valve 712 may be connected to the controller 126 (shown in FIG. 7) and operated in substantially the same manner as valve 82 (shown in FIG. 7) as described herein. For example, the controller 126 (shown in FIG. 7) is configured to modulate the valve 712 of each nozzle assembly 700 between a closed position and an opened position to regulate fluid flow through the valve 712 and the nozzle assemblies 700. In particular, the fluid F is allowed to flow through each nozzle assembly 700 when the respective valve 712 is in the opened position. When the valve 712 is in the closed position, the fluid F is inhibited from flowing through the nozzle assembly 700. In other embodiments, the nozzle assembly 700 may include any valve that enables the nozzle assembly to operate as described herein. In some embodiments, the valve 712 may be located separate from a nozzle of the nozzle assembly 700, similar to the nozzle 80 and valve 82 shown in FIG. 7.

Each pressure dampener 702 may be connected in fluid communication with a respective fluid passage 706 upstream of the respective electrically actuated valve 712. In this embodiment, the pressure dampener 702 is mounted to the nozzle assembly body 704. Moreover, the pressure dampeners 702 and nozzle assemblies 700 are coupled to the manifold 104 (shown in FIG. 4) in a manner that allows the fluid F within the internal passageway 106 (shown in FIG. 7) to flow at least partially into the pressure dampeners 702 and/or to compress the gas within a cavity 716 of the pressure dampeners 702. For example, in the illustrated embodiment, a fluid line or pipe 720 is connected to the fluid passage 706 and the pressure dampener 702. The fluid line 720 defines a passage extending between and providing fluid communication between the fluid passage 706 and the cavity 716 of the pressure dampener 702. As a result, the pressure dampeners 702 are configured to dampen fluctuations in fluid pressure within the internal passageway of the fluid passage 706 and the manifold 104 (shown in FIG. 2).

Figure 15:
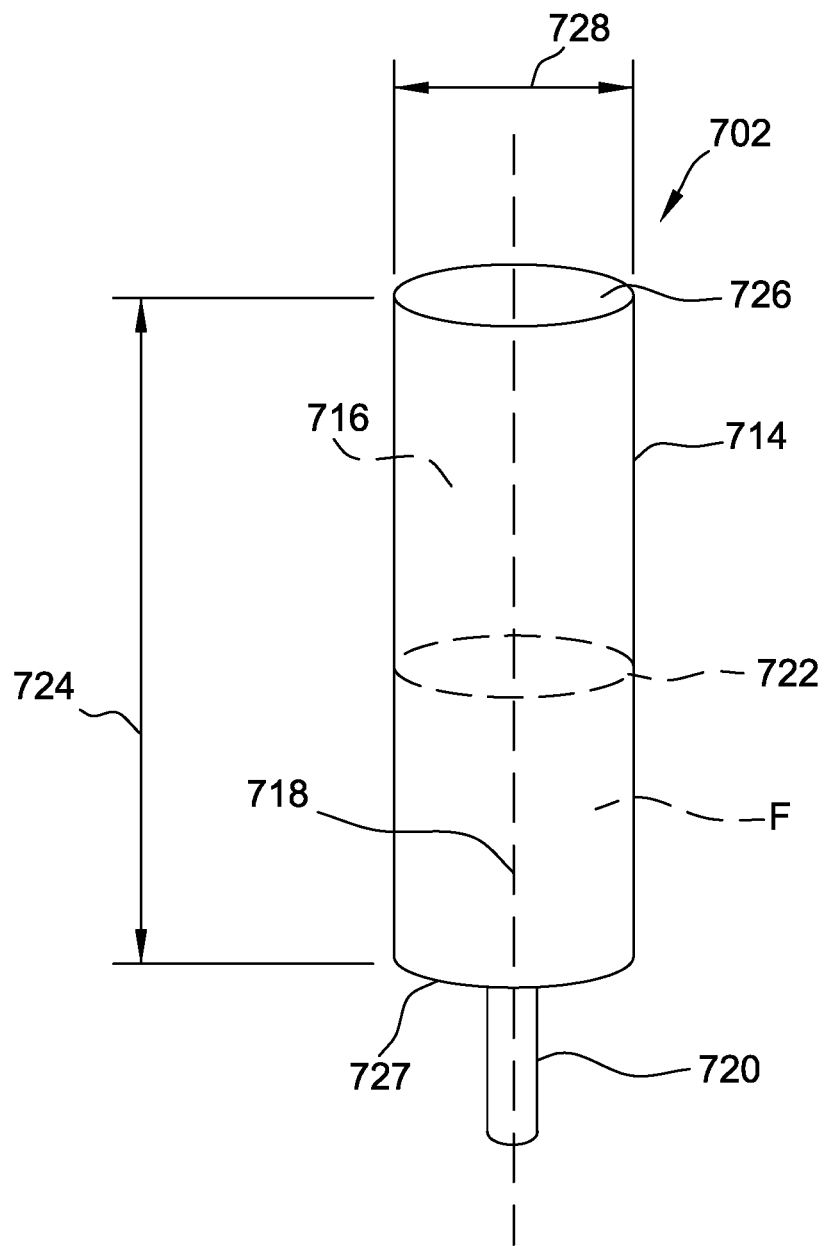
FIG. 15 is a perspective view of a pressure dampener of the nozzle assembly shown in FIG. 14.

FIG. 15 is a perspective view of the pressure dampener 702. In the illustrated embodiment, the pressure dampener 702 is a standpipe and includes a sidewall 714 defining a cavity 716 having a volume containing gas therein. In the illustrated embodiment, the sidewall 714 forms a substantially cylindrical shape, although the pressure dampener 702 may have any suitable shape that enables the pressure dampener 702 to function as described herein. In the illustrated embodiment, the sidewall 714 extends around and along a vertical axis 718, in reference to the orientation shown in FIG. 15, from an upper end 726 to a lower end 727. In some embodiments, when the pressure dampener 702 is incorporated into the nozzle assembly 700 of a seed planting system 100 or other fluid application system, the pressure dampener 702 is oriented vertically and perpendicular to a travel direction 34 of the fluid application system. In other words, the vertical axis 718 of the pressure dampener 702 is oriented perpendicular to both the travel direction 34 of the fluid application system and the field or ground to which fluid is being applied. The upper end 726 and the lower end 727 of the pressure dampener 702 are closed, with the exception of an opening defined in the lower end 727 that is connected to the fluid line 720. Accordingly, gas is confined or trapped in an upper portion of the cavity 716.

The fluid passage 706 has a volume. In some embodiments, the volume of the gas within the pressure dampener cavity 716 varies based upon a pressure of the fluid within the fluid passage 706. Specifically, the volume of gas in the cavity 716 and the pressure of the fluid within the fluid passage 706 are inversely proportional, i.e., the volume of the gas decreases as the pressure of the liquid increases and vice versa. The volume of the cavity 716 may be determined based on the desired operating pressure and flow rate range of the fluid application system in which the nozzle assembly 700 is implemented (e.g., the seed planting system 100 shown in FIG. 1). For example, the volume of the cavity 716 may be determined using the equation:

$$V_1 = \frac{\Delta V}{1 - \left(\frac{2 - \delta_p}{2 + \delta_p}\right)^{\frac{1}{\kappa}}}$$

where $\Delta V$ represents the change in volume of the liquid flow within the fluid passage, $\delta_p$ represents the pressure ripple ratio which may be calculated based on the precharge pressure and the operating pressure, $\kappa$ is a coefficient related to the gas within cavity 716, and $V_1$ represents the volume of the pressure dampener cavity 716. Using the above equation or other fluid pressure equations known in the art, the pressure dampener 702 may be sized to accommodate pulses of the liquid flow within the fluid passage 706 at a specified pressure. In other embodiments, the cavity 716 may have any suitable volume that enables the pressure dampener 702 to operate as described herein.

The pressure dampener 702 has a length 724 extending in the vertical direction and measured from the upper end 726 of the pressure dampener 702 to the lower end 727 of the pressure dampener 702. The pressure dampener 702 may have any suitable length 724 that enables the pressure dampener 702 to function as described herein. Each pressure dampener 702 also has a width or diameter 728 defined by the sidewall 714. The pressure dampener 702 may have any suitable width 728 that enables the pressure dampener 702 to function as described herein.

Also, the pressure dampener 702 may be made of any suitable materials such as metals, plastics, and/or combinations thereof. In the exemplary embodiment, the pressure dampener 702 is made of plastic. In particular, the pressure dampener 702 is made of polyvinyl chloride (PVC). In alternative embodiments, the pressure dampener 702 is made of stainless steel, polypropylene, glass-filled nylon, and/or an elastomer such as a fluoropolymer elastomer.

In operation, fluid F may flow into the cavity 716 from the fluid line 720 and/or compress gas confined within the cavity 716. In some embodiments, for example, fluid F may flow into a lower portion of the pressure dampener cavity 716 from the fluid line 720. A fluid level 722 may be established based on the pressure of the fluid F and the volume of gas trapped in the upper portion of the pressure dampener cavity 716. The fluid level 722 within the cavity 716 may change based on fluctuations in the pressure or flow of the fluid F within the nozzle assembly 700 and the manifold 104 (shown in FIG. 4). For example, fluid F may flow into the cavity 716 and the fluid level 722 may rise when the valve 712 (shown in FIG. 14) is moved to a closed position. As a result, the pressure dampener 702 dampens fluctuations in fluid pressure due to the valves 712 moving between the opened position and the closed position.

In the illustrated embodiment, the pressure dampener 702 has a free liquid surface such that the liquid and gas are allowed to interface at the fluid level 722 within the pressure dampener cavity 716. In other embodiments, a membrane or bladder is disposed within the pressure dampener cavity 716 and separates the gas and the liquid. In such embodiments, the amount of gas within the pressure dampener cavity 716 may be adjusted to provide dampening at different pressures. For example, the bladder may allow the pressure dampener 702 to operate at higher pressures because additional gas may be added to the pressure dampener cavity 716 to accommodate pressure increases within the pressure dampener cavity. In addition, the bladder may extend longitudinally within the pressure dampener cavity 716 to provide increased surface area for the liquid and gas to interact through the bladder.

Suitably, at least one pressure dampener 702 is included in each nozzle assembly of the seed planting system 100. However, in some embodiments, each nozzle assembly may not require a separate pressure dampener 702. For example, in some embodiments, a pressure dampener 702 may be connected to more than one nozzle assembly. In further embodiments, a pressure dampener 702 may be connected to one or more nozzle assemblies of a section and be configured to dampen fluctuations in fluid pressure caused by the section of nozzle assemblies being actuated.

Although the pressure dampeners 702 are described with reference to the seed planting system 100, it should be understood that the pressure dampeners 702 may be implemented with nozzle assemblies on other agricultural fluid application systems, such as liquid fertilizer application systems and agricultural sprayer systems. In some embodiments, for example, the pressure dampeners 702 may be implemented on a sprayer system, such as the fluid application system 300 shown in FIG. 9.

While, in some embodiments, the described methods and systems are used to apply a fluid, such as pesticides and liquid fertilizers, to agricultural fields, the described methods and systems may be used for applying any type of fluids to surfaces, and are not limited to application of agricultural fluids.

Embodiments of the methods and systems described herein may more efficiently apply fluids to surfaces compared to prior methods and systems. For example, the systems and methods described provide improved fluid application systems that increase the precision and operating efficiency of application systems. More specifically, the embodiments described reduce pressure fluctuations of fluids within a manifold to reduce incidents of misapplication. In some embodiments, the embodiments described provide systems that include individual control of electronically actuated valves connected to the manifold.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

When introducing elements of the present invention or the preferred embodiment(s) thereof, the articles "a", "an", "the" and "the" are intended to mean that there are one or more of the elements. The terms "comprising", "including" and "having" are intended to be inclusive and mean that there may be additional elements other than the listed elements. Moreover, the use of "top", "bottom", "above", "below" and variations of these terms is made for convenience, and does not require any particular orientation of the components.

As various changes could be made in the above without departing from the scope of the invention, it is intended that all matter contained in the above description and shown in the accompanying drawings shall be interpreted as illustrative and not in a limiting sense.

What is claimed is:

1. A fluid application system comprising:
 a manifold defining an internal passageway for fluid flow therethrough; and
 a plurality of valve assemblies connected in fluid communication with the internal passageway, wherein each valve assembly of the plurality of valve assemblies comprises:
  a body defining a fluid passage;
  an electrically actuated valve configured to control fluid flow through the fluid passage; and
  a pressure dampener mounted to the body and connected in fluid communication with the fluid passage, the pressure dampener defining a cavity having a volume containing gas therein, wherein the pressure dampener is configured to dampen fluctuations in fluid pressure within the fluid passage.

2. The fluid application system of claim 1, wherein each valve assembly further comprises an inlet for receiving fluid flow into the fluid passage, and an outlet for discharging fluid from the fluid passage.

3. The fluid application system of claim 1 further comprising a controller communicatively connected to the electrically actuated valve of each of the plurality of valve assemblies, wherein the controller is configured to control the electrically actuated valves independently of one another.

4. The fluid application system of claim 1, wherein the electrically actuated valve comprises a solenoid coil attached to the body and a movable poppet that is movable between an opened position and a closed position to regulate fluid flow through the fluid passage.

5. The fluid application system of claim 1, wherein the pressure dampener of each valve assembly is a cylinder.

6. The fluid application system of claim 5, wherein the pressure dampener of each valve assembly is oriented vertically and perpendicular to a travel direction of the fluid application system.

7. The fluid application system of claim 6, wherein the pressure dampener includes a sidewall, a closed upper end, and a lower end defining an opening therein providing fluid communication with the fluid passage, the sidewall extending between the closed upper end and the lower end.

8. The fluid application system of claim 1, further comprising a plurality of nozzles, wherein each nozzle is fluidly coupled downstream from a respective one of the valve assemblies by a fluid line.

9. The fluid application system of claim 1 in combination with a seed planting system for dispensing fluid on or adjacent to seeds dispensed from the seed planting system, the seed planting system comprising:
 a seed dispenser configured to dispense seeds through at least one of a plurality of seed dispensing outlets and into a furrow.

10. The fluid application system of claim 9, wherein the electrically actuated valve comprises a solenoid coil attached to the body and a movable poppet that is movable between an opened position and a closed position to regulate fluid flow through the fluid passage.

11. The fluid application system of claim 9, further comprising a controller communicatively connected to the electrically actuated valve of each of the plurality of valve assemblies, wherein the controller is configured to control the electrically actuated valves independently of one another.

12. The fluid application system of claim 9, wherein the pressure dampener of each valve assembly is oriented vertically and perpendicular to a travel direction of the seed planting system.

13. The fluid application system of claim 9, wherein the seed dispenser includes a seed meter configured to dispense seeds into the furrow at a seed frequency.

14. The fluid application system of claim 9, wherein the pressure dampener of each valve assembly includes a sidewall, a closed upper end, and a lower end defining an opening therein providing fluid communication with the fluid passage, the sidewall extending between the closed upper end and the lower end.

15. A valve assembly for use with a fluid application system, the valve assembly comprising:
a body defining a fluid passage;
an electrically actuated valve configured to control fluid flow through the fluid passage; and
a pressure dampener mounted to the body and connected in fluid communication with the fluid passage, the pressure dampener defining a cavity having a volume containing gas therein, wherein the pressure dampener is configured to dampen fluctuations in fluid pressure within the fluid passage.

16. The valve assembly of claim 15 further comprising an inlet for receiving fluid flow into the fluid passage, and an outlet for discharging fluid from the fluid passage.

17. The valve assembly of claim 15, wherein the pressure dampener is a cylinder.

18. The valve assembly of claim 15, wherein the electrically actuated valve comprises a solenoid coil attached to the body and a movable poppet that is movable between an opened position and a closed position to regulate fluid flow through the fluid passage.

19. The valve assembly of claim 15, wherein the pressure dampener includes a sidewall, a closed upper end, and a lower end defining an opening therein providing fluid communication with the fluid passage, the sidewall extending between the closed upper end and the lower end.

20. The valve assembly of claim 15, wherein the pressure dampener is oriented vertically and perpendicular to a travel direction of the fluid application system.

* * * * *